(12) United States Patent
Gecchelin et al.

(10) Patent No.: US 11,535,314 B2
(45) Date of Patent: Dec. 27, 2022

(54) SELECTIVELY COMBINABLE INDEPENDENT DRIVING VEHICLES

(71) Applicant: GETPLUS S.R.L., Padua (IT)

(72) Inventors: Tommaso Gecchelin, Mira (IT); Emmanuele Spera, San Jose, CA (US)

(73) Assignee: GETPLUS S.R.L., Padua (IT)

( * ) Notice: Subject to any disclaimer, the term of this patent is extended or adjusted under 35 U.S.C. 154(b) by 0 days.

(21) Appl. No.: 15/721,830

(22) Filed: Sep. 30, 2017

(65) Prior Publication Data
US 2018/0022405 A1    Jan. 25, 2018

Related U.S. Application Data

(63) Continuation of application No. PCT/US2016/025446, filed on Mar. 31, 2016.
(Continued)

(51) Int. Cl.
    B62D 47/00      (2006.01)
    B60D 1/36      (2006.01)
    (Continued)

(52) U.S. Cl.
    CPC ............ B62D 47/006 (2013.01); B60D 1/36 (2013.01); B60D 1/481 (2013.01); B60D 1/62 (2013.01);
    (Continued)

(58) Field of Classification Search
    CPC .... B62D 47/006; B62D 12/02; B62D 47/025; G05D 1/0088; B60D 1/36; B60D 1/62; B60D 1/481; B60K 2031/005
    (Continued)

(56) References Cited

U.S. PATENT DOCUMENTS

| | | | | |
|---|---|---|---|---|
| 1,458,134 A | * | 6/1923 | Jean ...................... | B63B 35/665 |
| | | | | 114/77 R |
| 3,854,542 A | * | 12/1974 | Jesswein .............. | B62D 49/007 |
| | | | | 180/313 |

(Continued)

FOREIGN PATENT DOCUMENTS

| | | |
|---|---|---|
| CN | 201670287 U | 12/2010 |
| JP | 2008178184 A | 7/2008 |

OTHER PUBLICATIONS

Tommaso Gecchelin: "Next Modular Self Driving Vehicle Creates Comfortable Space For Traveling", Futuristic News, Jul. 24, 2013 (Jul. 24, 2013), p. 6 pp., XP055524764, Retrieved from the Internet: URL:https://web.archive.org/web/20130724091933/http:/1futuristicnews.com/next-modular-self-driving-vehicle-createscomfortable-space-for-traveling/ [retrieved on Nov. 19, 2018].

*Primary Examiner* — Muhammad Shafi
(74) *Attorney, Agent, or Firm* — Carter, DeLuca & Farrell LLP; George Likourezos

(57) ABSTRACT

An apparatus and system for: combining independent driving vehicles into a single assembly for condensed, efficient, variable capacity transportation on common routes; and for separating into independent vehicles for flexibility on diverse routes. Connection logistics are exchanged locally via line of sight optical channel. Retractable coupling and mated coupling on opposing ends of the vehicles provide multiple degrees of freedom (DOF) to accommodate misalignment during initial dynamic engagement, and lock as rigidly coupled assembly with zero DOF. Mating vehicles' doors open during transit, permitting inter-vehicle movement and consolidation of passengers en route to urban locales, and release of empty vehicles. On return, independent vehicles combine to dense passenger vehicles from urban locales for redistribution of passengers in individual vehicles that later separate for diverse destinations. Slaved (Continued)

vehicle systems allow one vehicle to control coupled vehicles' systems of retractable suspension, coordinated steering, power sharing. Utility vehicles couple to assembly for service.

24 Claims, 24 Drawing Sheets

Related U.S. Application Data

(60) Provisional application No. 62/140,807, filed on Mar. 31, 2015.

(51) Int. Cl.
| | |
|---|---|
| *B60D 1/48* | (2006.01) |
| *B60D 1/62* | (2006.01) |
| *B62D 47/02* | (2006.01) |
| *B62D 12/02* | (2006.01) |
| *G05D 1/00* | (2006.01) |
| *B60K 31/00* | (2006.01) |

(52) U.S. Cl.
CPC ........... *B62D 12/02* (2013.01); *B62D 47/025* (2013.01); *G05D 1/0088* (2013.01); *B60K 2031/005* (2013.01)

(58) Field of Classification Search
USPC .......................................... 701/23
See application file for complete search history.

(56) References Cited

U.S. PATENT DOCUMENTS

| | | | | |
|---|---|---|---|---|
| 5,074,569 | A * | 12/1991 | Kawabata | B60G 17/017 280/5.514 |
| 5,813,349 | A * | 9/1998 | Jensen | B61B 1/02 104/118 |
| 5,845,583 | A * | 12/1998 | Jensen | B60K 6/46 105/72.2 |
| 2002/0175248 | A1 | 11/2002 | Fox | |
| 2004/0262940 | A1* | 12/2004 | Johnson | B60N 2/01 296/64 |
| 2006/0170188 | A1* | 8/2006 | Negre | B62D 33/023 280/403 |
| 2010/0044998 | A1* | 2/2010 | Franchineau | B62D 47/025 280/491.1 |
| 2011/0108334 | A1* | 5/2011 | Andre | B62D 53/005 180/14.2 |

\* cited by examiner

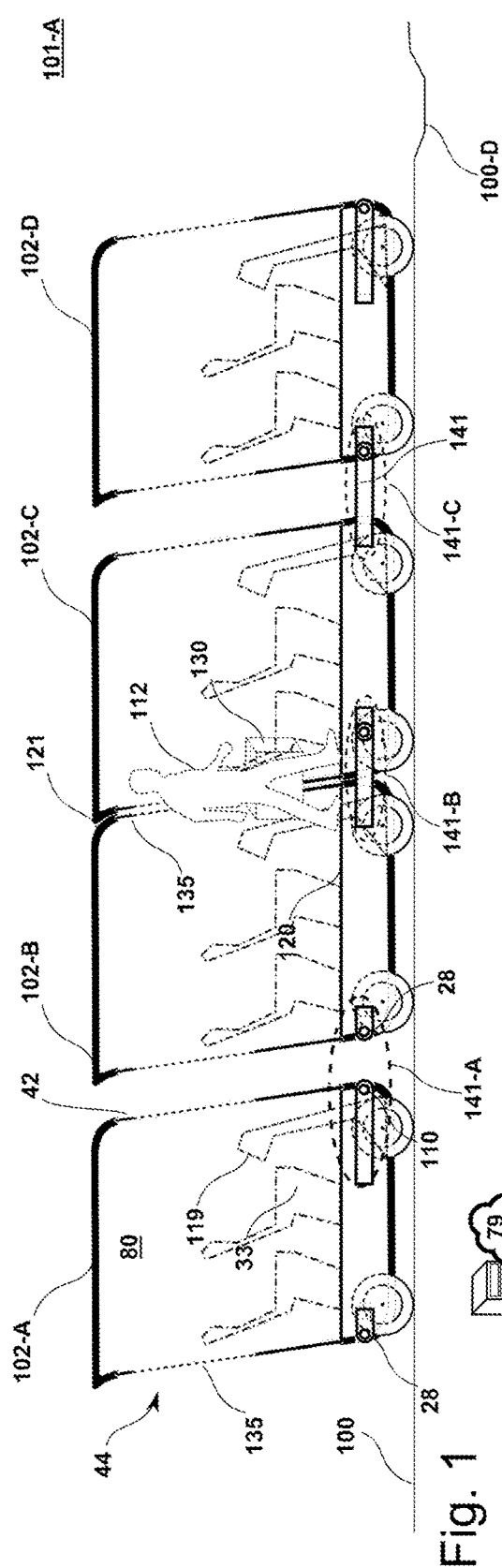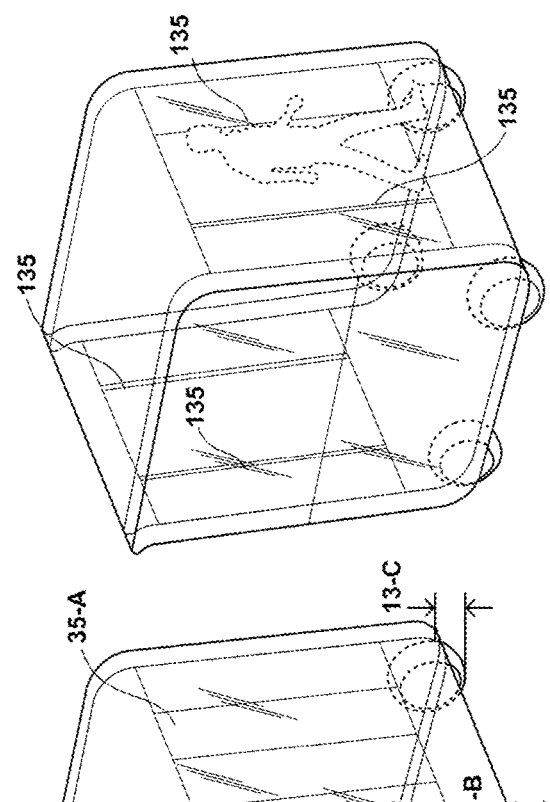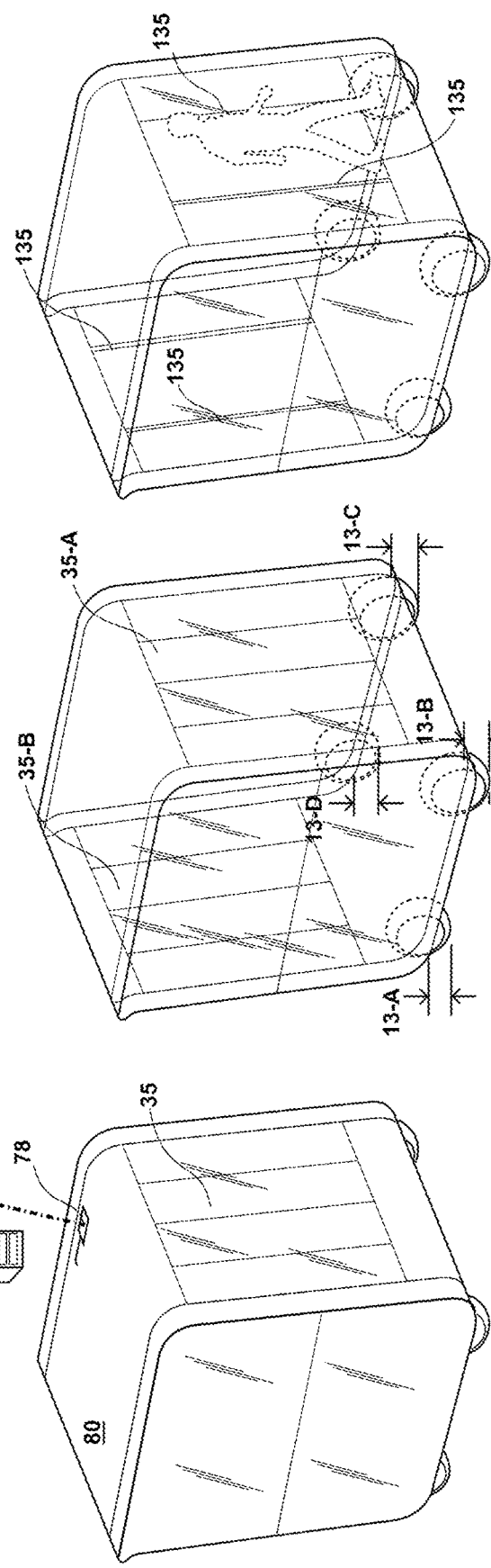

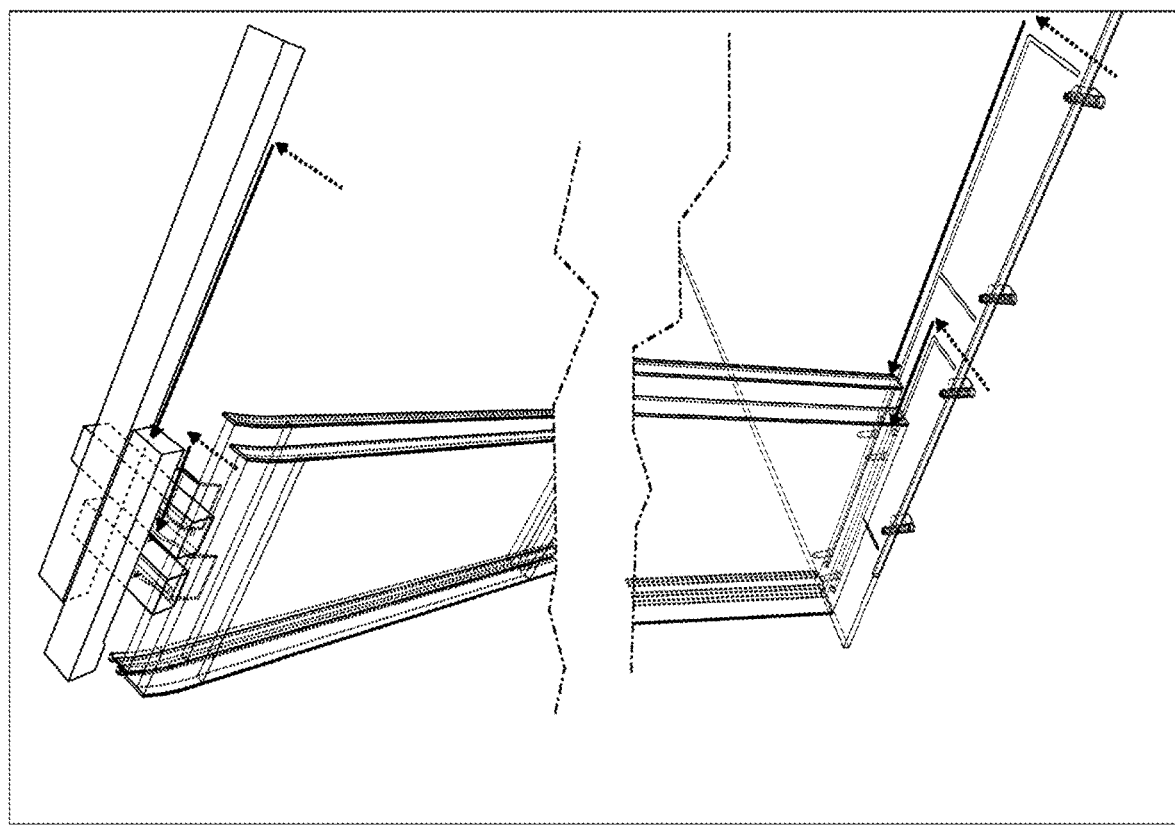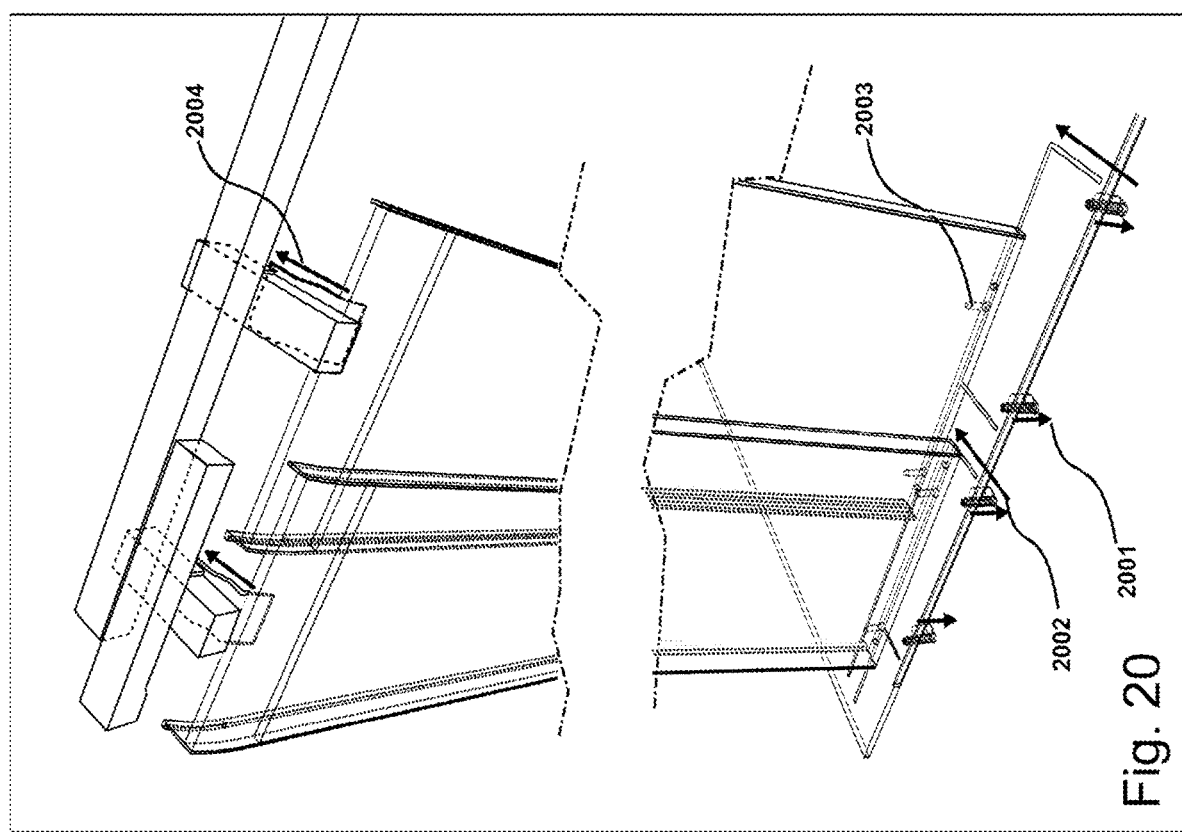
Fig. 20

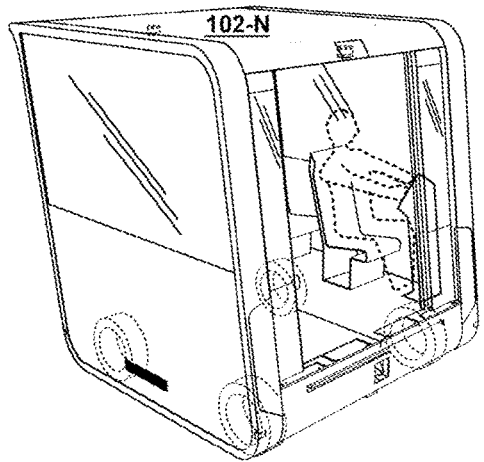
Fig. 25-A
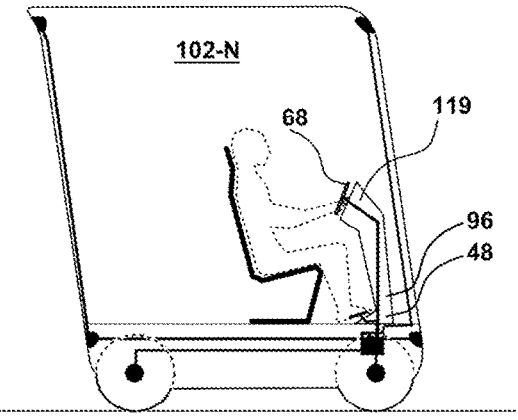
Fig. 25-B
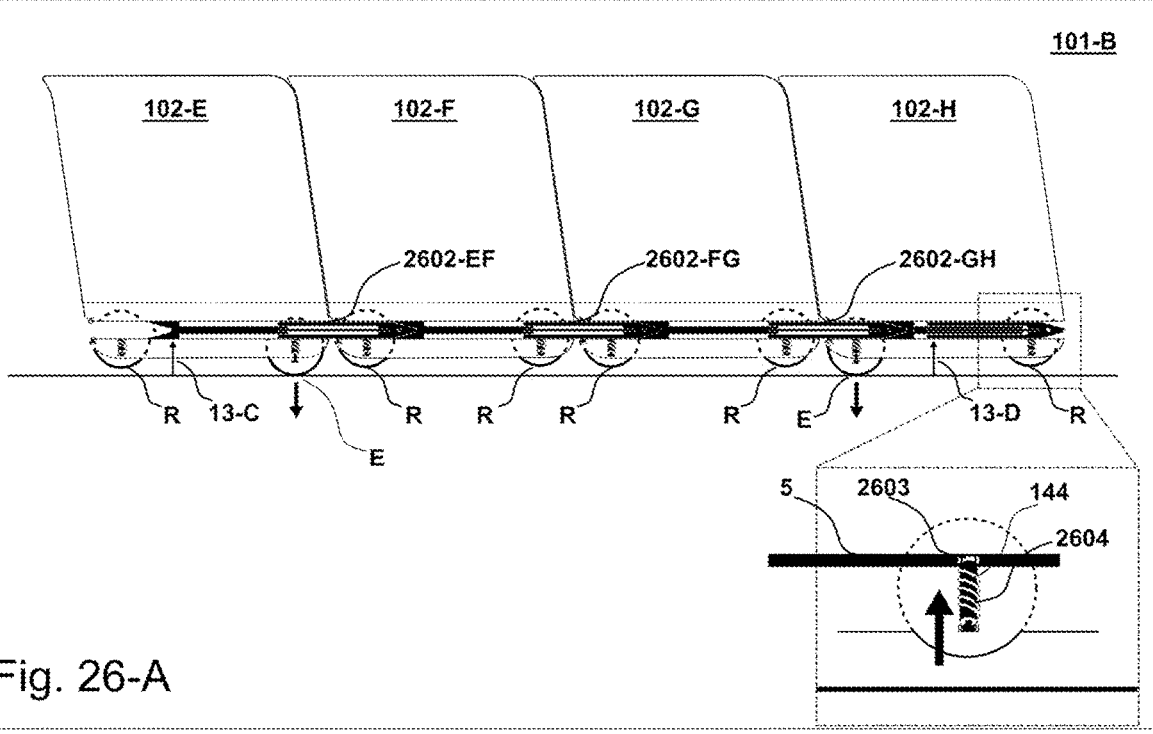
Fig. 26-A
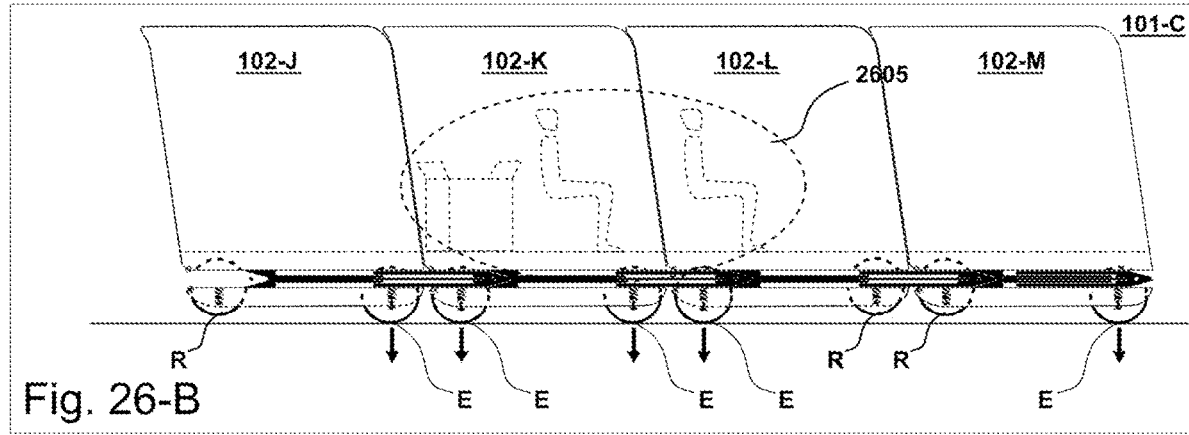
Fig. 26-B

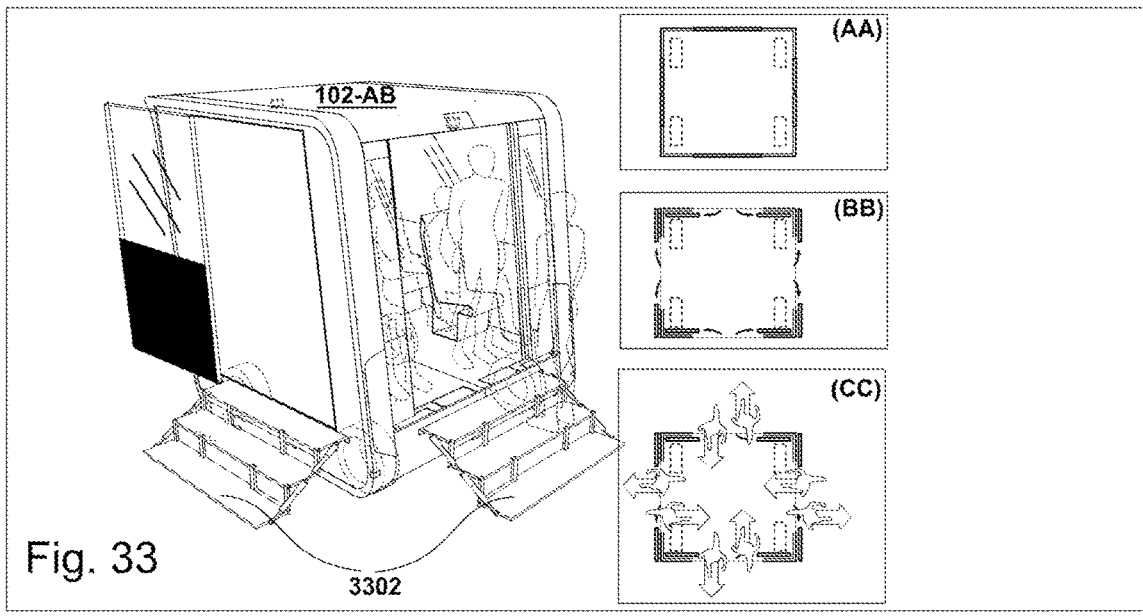
Fig. 33
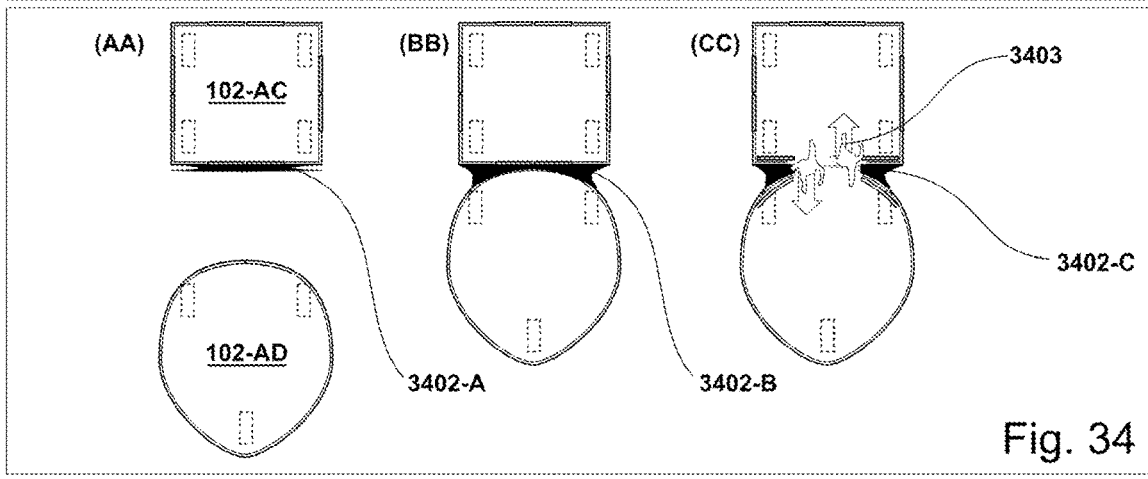
Fig. 34
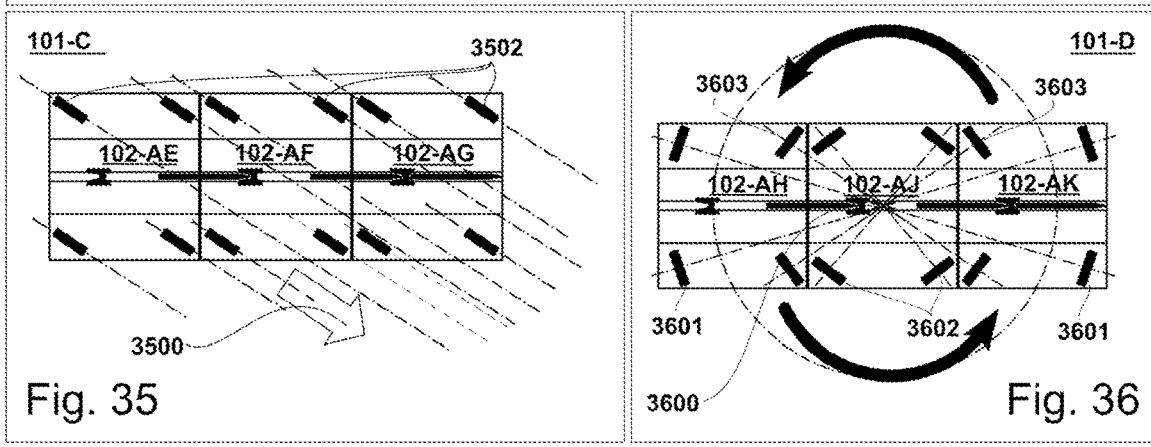
Fig. 35
Fig. 36
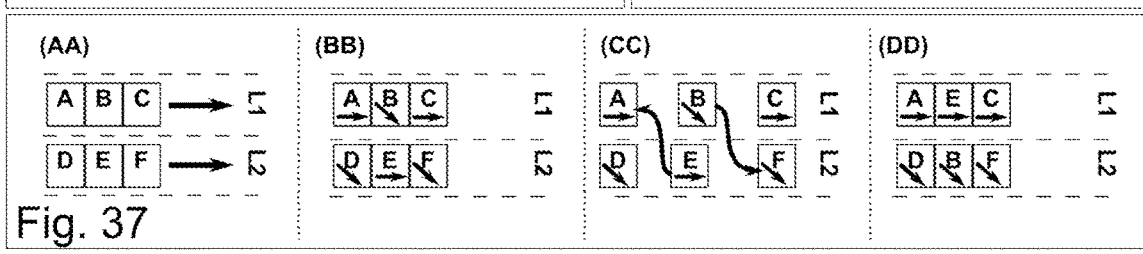
Fig. 37

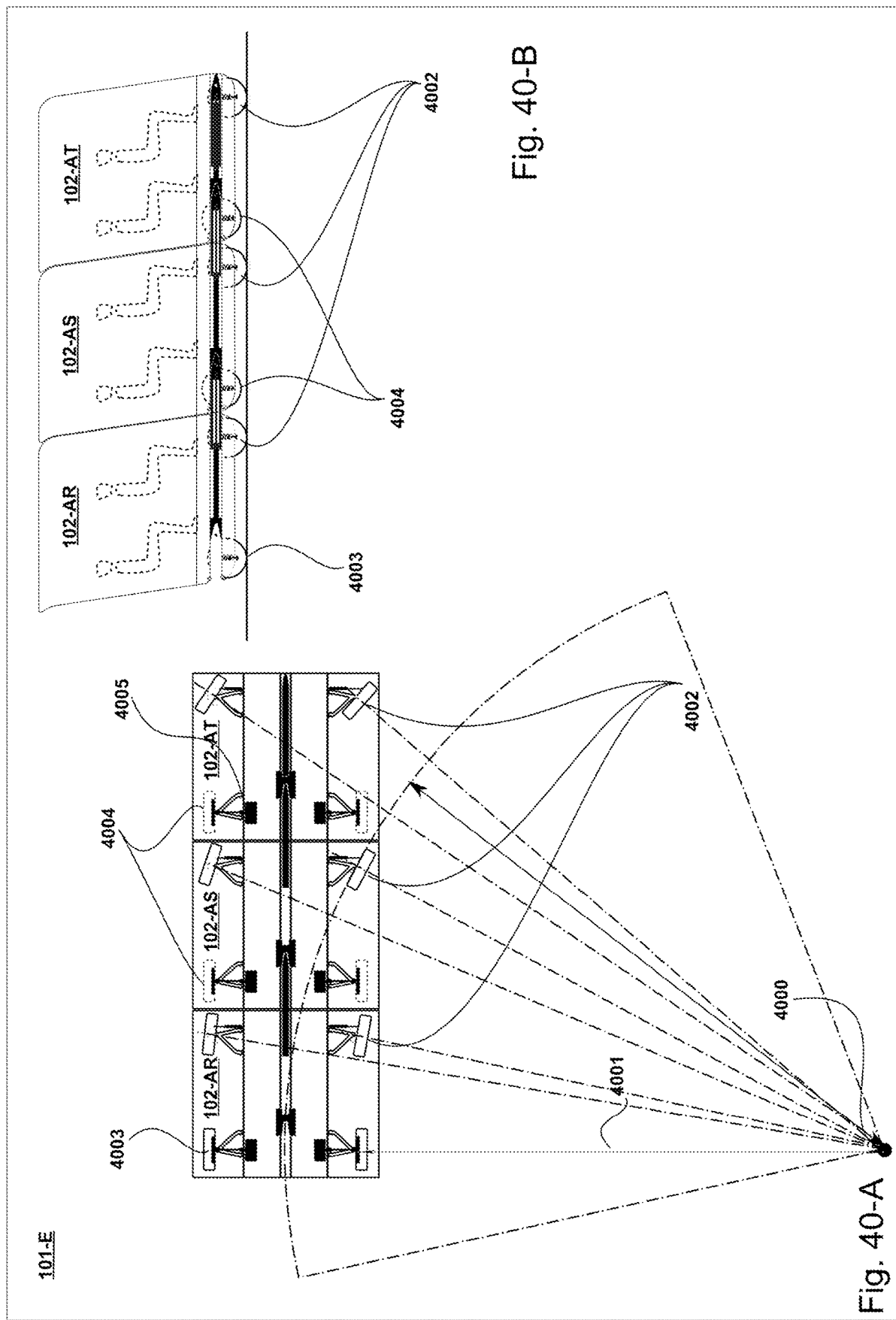

SELECTIVELY COMBINABLE INDEPENDENT DRIVING VEHICLES

CROSS-REFERENCE TO RELATED APPLICATIONS

This application is a continuation of, and claims priority to: i) PCT application PCT/US16/25446 entitled "SELECTIVELY COMBINABLE INDEPENDENT DRIVING VEHICLES", filed Mar. 31, 2016; and ii) US provisional application(s): Ser. No. 62/140,807 filed Mar. 31, 2015, entitled "SELF DRIVING AUTONOMOUS VEHICLE," in the United States Patent and Trademark Office, all disclosures of which are incorporated by reference herein in their entireties.

FIELD OF THE INVENTION

Embodiments of the present invention relate generally to the field of vehicular transportation and in one embodiment to combining independent driving vehicles into a rigid assembly of a single unit for more efficient transportation on main routes and to separating the rigid assembly into independent self driving vehicles for flexibly routing on diverse routes

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Computerized/robotic self driving vehicles are capable of navigating through traffic using sensors including laser based radars. The laser allows the vehicle to generate a detailed 3D map of its environment. The vehicle takes these generated maps and combines them with high resolution maps of the world, producing different types of data models that allow it to drive itself.

However, such self driving cars have space limitations and can only accommodate a fixed number of people and can drive to one location or destination at a given time.

SUMMARY OF THE DESCRIPTION

An apparatus and system for combining independent driving vehicles into a single rigid assembly for condensed, efficient transportation on common routes and for separating into independent driving vehicles for flexibility on diverse routes. Connection logistics are exchanged locally via line of sight optics. Retractable coupling and a mated coupling on either end of the vehicles, with multiple degrees of freedom, accommodate potential misalignment during initial engagement, and are drawn together and locked to rigidly couple the assembly during transit. Mating doors on vehicles open in transit after engagement to allow consolidation of passengers between vehicles and release of empty vehicles en route to urban locales. Conversely, independent vehicles are added to dense passenger vehicles from urban locales for redistribution of passengers among vehicles during transit for diverse destinations. Slaved vehicle systems allow one vehicle in assembly to control attached vehicles' systems of retractable suspension, coordinated steering, power sharing.

In one embodiment, an independent terrestrial vehicle comprises a chassis having a plurality of wheels, and having a first end and a second end; at least one independent vehicle system of an energy storage system, a propulsion system, a braking system, an active suspension system, and a steering system. Vehicle also includes a coupling disposed in a first end or second end of the chassis; a mated coupling disposed in an end of the chassis opposite of that for the coupling; and wherein at least one of the wheels includes a steering mechanism coupled to the chassis; and the coupling is selectively engageable with a mated coupling of another independent vehicle. The coupling is selectively retractable into the chassis from a first position to a second position. The coupling is rigidly coupleable to another independent vehicle with zero degrees of freedom of motion between the independent vehicle and the another independent vehicle when fully engaged and locked. Coupling includes a plurality of links coupled to each other to mate with a mated coupling; and wherein: the plurality of links selectively provides a variable degree of freedom ranging from zero degrees of freedom to at least three degrees of freedom. Vehicle also includes a receiver configured to receive a signal from a display on another independent vehicle or from an external source, wherein the signal is at least one of: a state of availability to connect via the coupling, a relative position and velocity, acceleration, and a road condition. Alternatively, the energy storage system, the propulsion system, the braking system, and the steering system. The vehicle also includes transmitter coupled to display a signal, wherein the signal is at least one of: a state of availability to connect via the coupling, a relative position and velocity, acceleration, and a road condition. The coupling includes a communication adapter configured to communicate instructions between the independent vehicle and another independent vehicle to control at least the steering system in either the independent vehicle or the another independent vehicle. Alternatively, the communication adapter is configured to communicate instructions between the independent vehicle and another independent vehicle to control at least two independent vehicle systems from the group of the energy storage system, the propulsion system, the active suspension system, the braking system, and the steering system in either the independent vehicle or the another independent vehicle. (And in another embodiment, the communication adapter is configured to control at least all the noted vehicle systems. A local controller controls at least one of an independent vehicle system including the energy storage system, the propulsion system, the active suspension, the braking system, and the steering system when configured to be selectively slaved to a receiver or to the communication adapter to control at least one of the independent vehicle systems. The coupling includes a power adapter to transfer power between the independent vehicle and another independent vehicle to power the propulsion system or to replenish the energy storage system.

Each independent vehicle includes: a locking means to restrain the coupling extended from the independent vehicles when the coupling is engaged in the mated coupling of another independent vehicle, and includes a locking means in the another independent vehicle to restrain the coupling received from the independent vehicles in the mated coupling of the another independent vehicle.

The independent vehicle further comprising a retractable staircase disposed on a front side of vehicle. The independent vehicle also includes a compartment disposed on the chassis for housing at least one of passengers or cargo, a first door (35-A) disposed in the first side of the chassis and a second door disposed in the second side of the chassis. The first side is the front portion of the independent vehicle for the principal direction of locomotion, the second side is the opposite of the first side, and the first and second doors permit selective ingress and egress of passengers or cargo from the independent vehicle. The first door is configured to open while the independent vehicle is in motion and when the independent vehicle is coupled to another independent vehicle disposed on the first side of the independent vehicle. The first end of the independent vehicle has a surface profile that matches, or is mateable, with the surface profile of the second end. Mating surfaces of coupled independent vehicles enables the vehicles to fit tighter as a single rigid unit, through which passengers and cargo can move without noise, wind, elements, or hazardous open space therebetween.

A selectively removable pod disposed on the chassis to control for one or more of a steering control, a braking control, and a propulsion control. The instrument pod allows direct manual input, or controller-assisted manual input, to noted controls as well as the active suspension system. The steering system is infinitely variable for controlling the angle of the wheels which have a wear surface (8-A) comprised of rubber, and which at least one set of the wheels is selectively retractable. The active suspension is coupled to the chassis and to the local controller and is capable of adjusting a height of the independent vehicle, e.g., to match another object, such as an independent vehicle targeted for coupling. A wireless transceiver receives information from outside the independent vehicle. The information includes an identification of another independent vehicle to which the independent vehicle will be coupled and a route or rendezvous location to enable the coupling of the independent vehicle to the another independent vehicle.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

Embodiments of the present invention are best understood by reference to the detailed figures and description set forth herein. Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive. Compounds, materials, manufacturing techniques, uses, and applications, described herein, as these may vary. The present invention will now be described in detail with reference to embodiments thereof as illustrated in the accompanying drawings.

BRIEF DESCRIPTION OF THE DRAWINGS

The present invention is illustrated by way of example and not limitation in the figures of the accompanying drawings in which like references indicate similar elements.

FIG. 1 illustrates an embodiment of a various independent vehicles coupled together, resulting in a single independent vehicle, according to one or more embodiments.

FIGS. 2-4 illustrates various embodiments of an independent vehicle, according to one or more embodiments.

FIGS. 20-21 illustrate the retraction of the locking pistons retracts that results in unlocking of the doors of an independent vehicle, according to one or more embodiments.

FIGS. 25-A and -B illustrate a selectively removable pod, according to one or more embodiments.

FIG. 26-A illustrates a rigidly coupled assembly of individual vehicles having retractable wheels, according to one or more embodiments.

FIG. 26-B illustrates a rigidly coupled assembly of individual vehicles having retractable wheels, according to one or more embodiments.

FIG. 33 is a variety of alternative door layouts in individual vehicles are shown, according to one or more embodiments.

FIG. 34 is an alternative individual vehicle shapes and interconnecting adapters are shown, according to one or more embodiments.

FIG. 35 is a top view showing the orientation of wheels on an RCVA 101-C, while performing a synchronized laterally linear steering maneuver, according to one or more embodiments.

FIG. 36 is a top view showing the orientation of wheels on an RCVA 101-D, while performing a synchronized center point turnaround maneuver according to one or more embodiments.

FIG. 37 is a driving scenario where individual vehicles from different RCVAs exchange positions and interleave with each other according to different destination routes, according to one or more embodiments.

FIGS. 40-A and 40-B is a top view and a side view illustration of a mixed orientation of wheels for an RCVA 101-E, while performing a turn, according to one or more embodiments.

Figure 5:
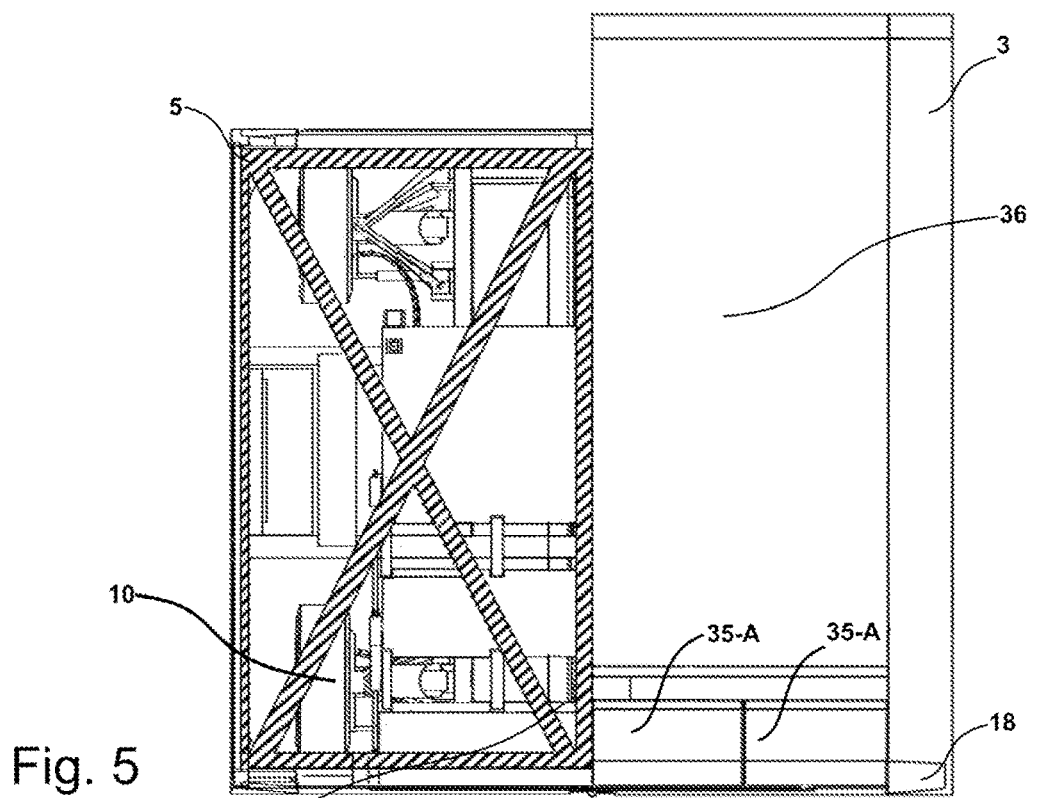
FIG. 5 illustrates a top half view/half section of an independent vehicle, according to one or more embodiments.

Other features of the present embodiments will be apparent from the accompanying drawings and from the detailed description that follows.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

FIG. 1 illustrates a side view of multiple independent driving vehicles 102-A, B, C, D ("IV", "IVs", or "Independent Vehicles") that can be coupled together to form a single rigidly-coupled vehicle assembly 101-A ("RCVA"). Each of the independent vehicles 102-A, B, C, D can be either a manually controlled/operated, (e.g., manual steering, propulsion, braking, etc. in optionally removable control pod 119) vehicle, a controller-assisted manually operated vehicle (assist with braking, traction, etc.), or a self driving autonomous vehicle control ("SDAV"). An SDAV vehicle can be controlled individually by an external control via remote server 79 via wireless transceiver 78, by internal self navigation and road negotiation computing sensors, hardware, and software, described hereinafter, or combination thereof, in one embodiment. RCVA 101 can be any combination of IVs with these different modes of controlling, providing that they have compatible couplings and mating couplings, and hardware/software protocol with which to engage each other.

In one embodiment, a human-driven vehicle, with or without SDAV capability, is a lead IV in an RCVA for multiple rigidly coupled IVs, wherein each IV either has no SDAV capability or has at least some SDAV capability, or full certification. This arrangement is suitable for mixed traffic applications even if prior to full certification of SDAV vehicles by themselves. Also, in this arrangement, some features of the SDAV are still realized by the individual SDAV when they disconnect from the RCVA and perform appropriate autonomous tasks in approved areas and/or applications. The SDAV is cheaper to operate when compared to a paid human driver. If all IVs coupled in the RCVA are SDAVs, then any one IV can be the lead vehicle and the lead driving control for the balance of the IVs in the RCVA. Different stages of engaging a coupling/mated coupling are shown as: unengaged 141-A, fully, or locked, engaged 141-B, and interim coupling or decoupling 141-C of joining system 141. Logistic server 79 can provide a external centralized management of IVs by being wirelessly coupled to each of a plurality of IVs planning to form an RCVA, in one embodiment via wireless transceiver 78, whether the IV is an SDAV, manually controlled, or assisted by local controller. Coupling information provided by logistic server 79 includes at least one of: an identification of another independent vehicle to which the independent vehicle will be coupled, route or rendezvous location, origin and destination, routing plans, connectability states of the IVs, list of IDs available for connection, rendezvous time and location, collection of statistics and traffic patterns, etc. to enable the coupling of the independent vehicle to the another independent vehicle. An alternative to centralized control for IVs forming RCVAs is to perform local identification and coupling requests on a local, case-by-case, ad hoc, independent basis between a plurality of IVs that can grow in number as additional IVs consecutively join.

The purpose of having combinable and separable IVs into and out of RCVAs is to provide condensed, efficient, variable capacity transportation on common routes; and for separating into independent vehicles for flexibility on diverse routes. In this manner, inter-vehicle movement and consolidation of passengers and/or cargo can occur en route to urban locales while the IV or RCVA is in motion, thus saving time. One or more empty IVs can be disconnected and released dynamically, in transit, from the RCVA and self-park in order to reduce the overall quantity of IVs on congested roadways, whether uncoupled separate IVs or coupled RCVAs. On return, one or more IVs can combine/re-combine in transit to the dense passenger IVs or RCVAs leaving urban locales for redistribution of passengers in one or more IVs that later separate for diverse destinations, e.g., suburbs, while the RCVA is still in transit, and without stopping, or with reduced stops, thus avoiding energy and time-consuming stops for route changes or drop-offs.

Figure 13:
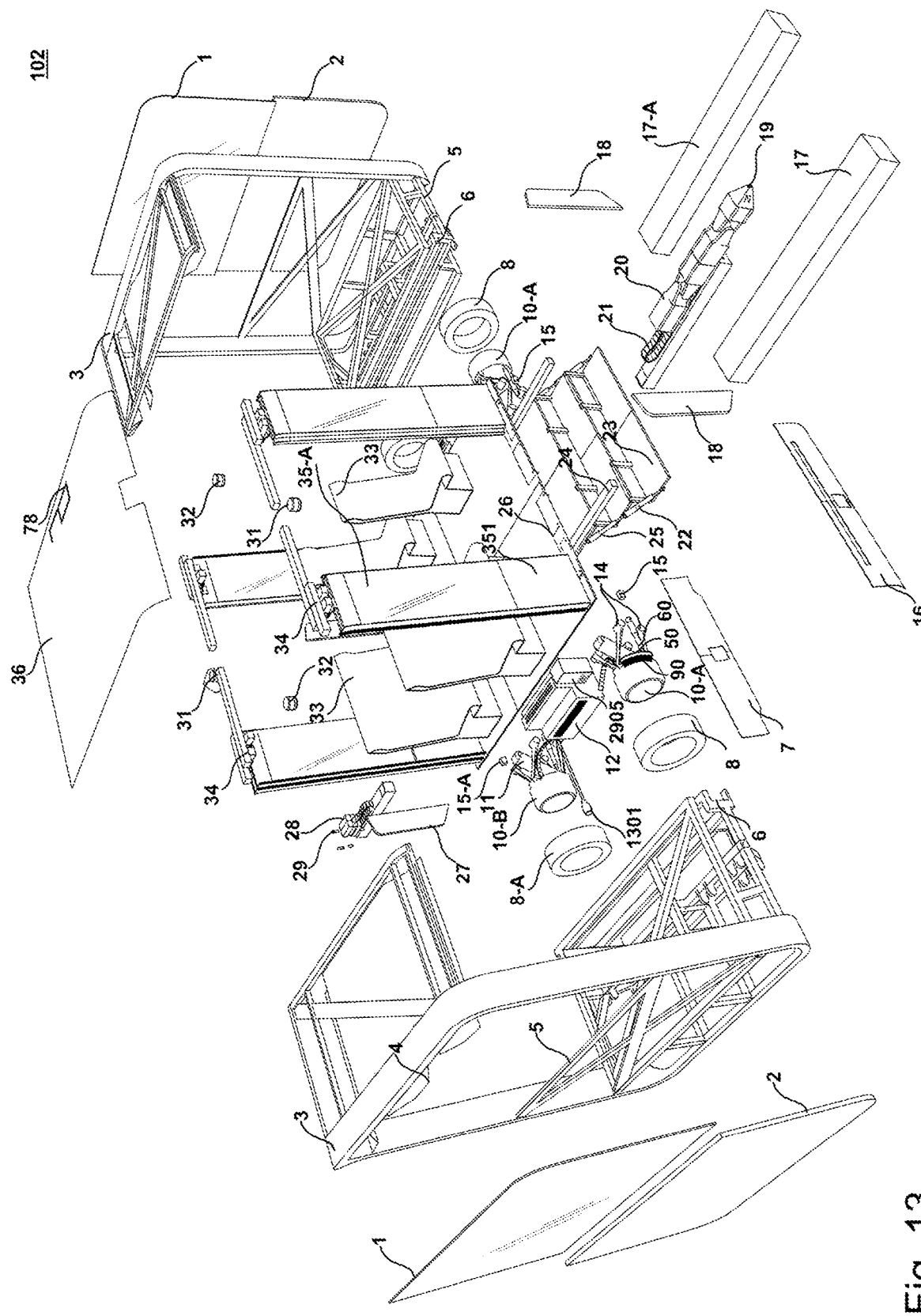
FIG. 13 illustrates a various components of an independent vehicle, according to one or more embodiments.
Figure 29:
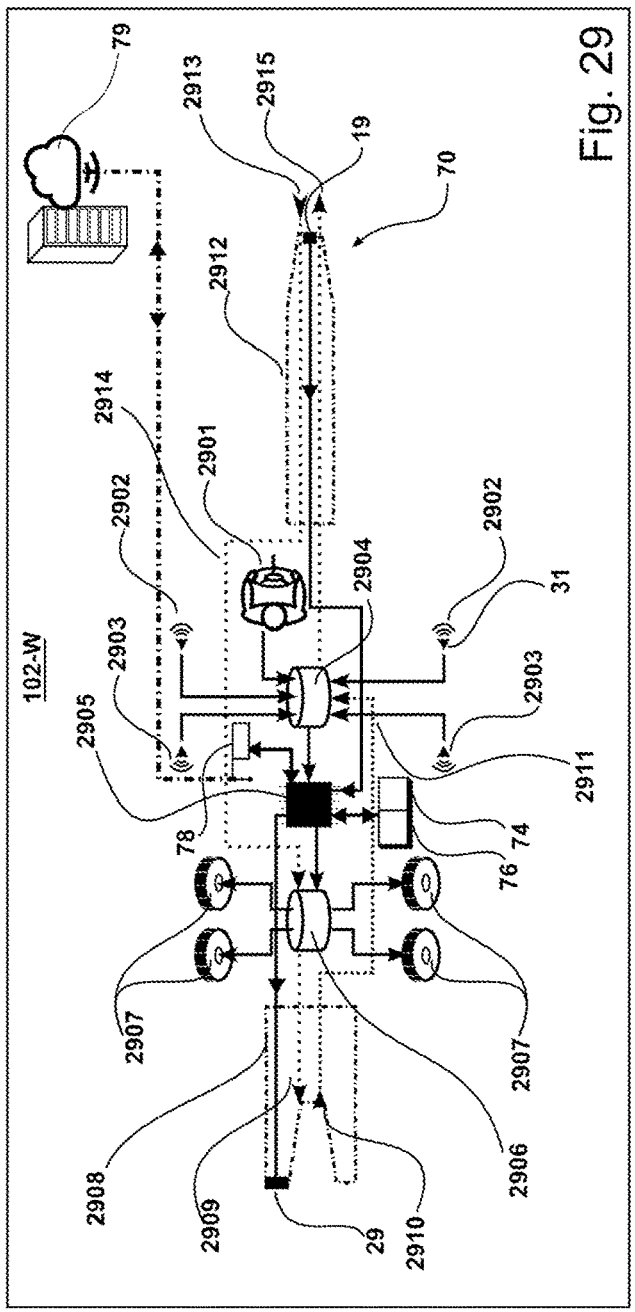
FIG. 29 illustrates a steering input for a single individual vehicle according to one or more embodiments.

The IVs 102-A, B, C, D, include at least one independent vehicle system, as shown in FIG. 13 or 29, of an energy storage system 17, a propulsion system 10, a braking system 90 (also provided by regenerative braking of motor 10), an active suspension system 11, and a steering system 60, and in one embodiment contain at least two of the independent vehicle systems, and in another most frequent embodiment includes all these systems. This characteristic is one factor that distinguishes an IV from a railroad car or light rail car, that has brakes and sometimes propulsion (within a passenger car), but not steering per se, and definitely not infinitely variable steering), and no energy storage system (passenger cars typically do not have energy storage, and a locomotive has energy storage, but no passenger or deliverable cargo). Steering can be implemented with mechanical linkage, hydraulic coupling, or steer by wire. Different embodiments of IVs use either all-wheel steering, or partial wheel steering, such as having only one or more sets of front wheels in the primary direction of locomotion, having steering capability as illustrated hereinafter. The IVs 102-A, B, C, D are preferably propelled by electric motors, and powered by an internal battery pack, or are propelled by an Internal Combustion Engines ("ICE") powered by fossil fuels, though the ICE version is less preferred for carbon footprint reasons. Battery packs in an IV are optionally rechargeable via wireless charging or via swappable batteries, either when IV is stationary or from an accessory vehicle, i.e., a cartridge battery vehicle, that couples to a given IV or RCVA to replace batteries or to recharge batteries of IV in situ. If an IV is not powering electric motors during transit, then its batteries can be replaced in transit, e.g., while coupled in an RCVA. In an alternative embodiment, electric motors may be powered by external two wire electricity feeds similar to a trolley, via an IV having this configuration and infrastructure, e.g., spring-loaded trolley poles, especially on long main routes, for pulling coupled IVs that do not the trolley configuration. The power from the two-wire feed can power electric motors directly and can charge internal battery packs of any of the rigidly coupled IVs.

Each IV includes a compartment 80 disposed on the chassis for housing at least one of passengers or cargo, in the present embodiment, with other uses and configurations of IVs are envisioned, such as service vehicles specified below. In one embodiment, IVs operate on conventional asphalt road (city streets, roads, highways, autobahns, etc.) 100. IVs can also be equipped with optional retractable railroad wheels (not shown) for operation on railroad tracks for main trunk routes, and disembarking from tracks near destination, retraction of RR wheels, and use of typical rubber road tires for local transportation. The same philosophy of grouping for mass transit trunk routes is applicable with the present disclosure on high-speed rail, bullet trains, and reduced pressure tube transport such as a hyperloop.

A typical IV includes a walkable floor 120, passenger seats 33, generic rubber car tires 8, where the wheels are integrated in the undercarriage, or chassis. An IV can be coupled and decoupled using joining system 141 comprising a receptor, aka hitch-receiver or mated coupling, portion 28 located on the one side, e.g., the back side 44, of the IV and a front robotic arm component, aka coupling, 110 disposed on the other side of IV, e.g., the front side 42, and that can couple to the receptor portion 28, as is further described herein. Coupling 110 and mated coupling 28 can be disposed on other ends of the vehicle if consistently used with other IVs.

In one embodiment, an IV has front and back sliding doors 35 that are operable when a separate IV is stationary or when multiple IVs are rigidly coupled in an RCVA. Inter-IV doors, between rigidly coupled IVs, are operable whether the RCVA is in motion or stationary, save privacy and repair issues. This allows passenger 112 walk freely inside the coupled IVs once at least two IVs are rigidly connected with each other as symbolized by 121 for IVs 102-B, C. Similarly, goods 130 can be redistributed inside the connected SDAVs for various logistical purposes. External doors 35 leading outside of the RCVA are operable preferably when the RCVA is stationary, or for emergency egress. Doors 35 are selectively movable without swinging about a pivot from a first position (closed) to a second position (open). This saves limited interior space of IVs. Entry to and exit from IVs is from the front or rear doors. An increased open space, and selective and/or temporal inter-IV transfer and movement of passengers, is available to passengers and cargo, when multiple IVs rigidly couple and mating doors are opened. Mating doors, e.g., 35 for IVs 102-B and C are selectively operated, based on privacy needs of passengers in each of the mating IVs.

In one embodiment, the vehicle chassis of an IV is approximately a sloped cube for aerodynamics and aesthetics, having an 8.2 foot tall ceiling for standing passengers. The interior space of an IV, in one embodiment, can fit an average of 6 people sitting and 4 standing with a walkable passage in the middle. In one embodiment, an IV can have an approximate length of 8.8 ft and an approximate width of 8.2 ft. In another embodiment, the interior height of an IV is at least 6.5 ft and having an average IV vehicle height of 9.2 ft and height of 8.7 ft (without considering wheels). However, IVs can be personal sized, as small as several feet width and length, coupe sized for two people, or made as long as can be coupled together. For example, on heavy traffic routes with concentrated origin and destination (without diversification in route), and with only gentle radius turns, large IV sizes can be used, e.g., 20-30 foot lengths, with a preferably limited consolidation of four or less IVs in a RCVA, though more are possible.

In yet another embodiment, an IV can comprise a removable pod 119 that includes a steering control, a braking control, and a propulsion control, or any navigation capable device (e.g., without limitation a joystick, etc.) that can be used to manually operate an IV. In another embodiment, a failsafe mechanical human driving console that includes a steering wheel and pedals can be provided. In yet another embodiment, the failsafe mechanical human driving console is recessed or concealed, only appearing when requested case of an emergency.

Figure 18:
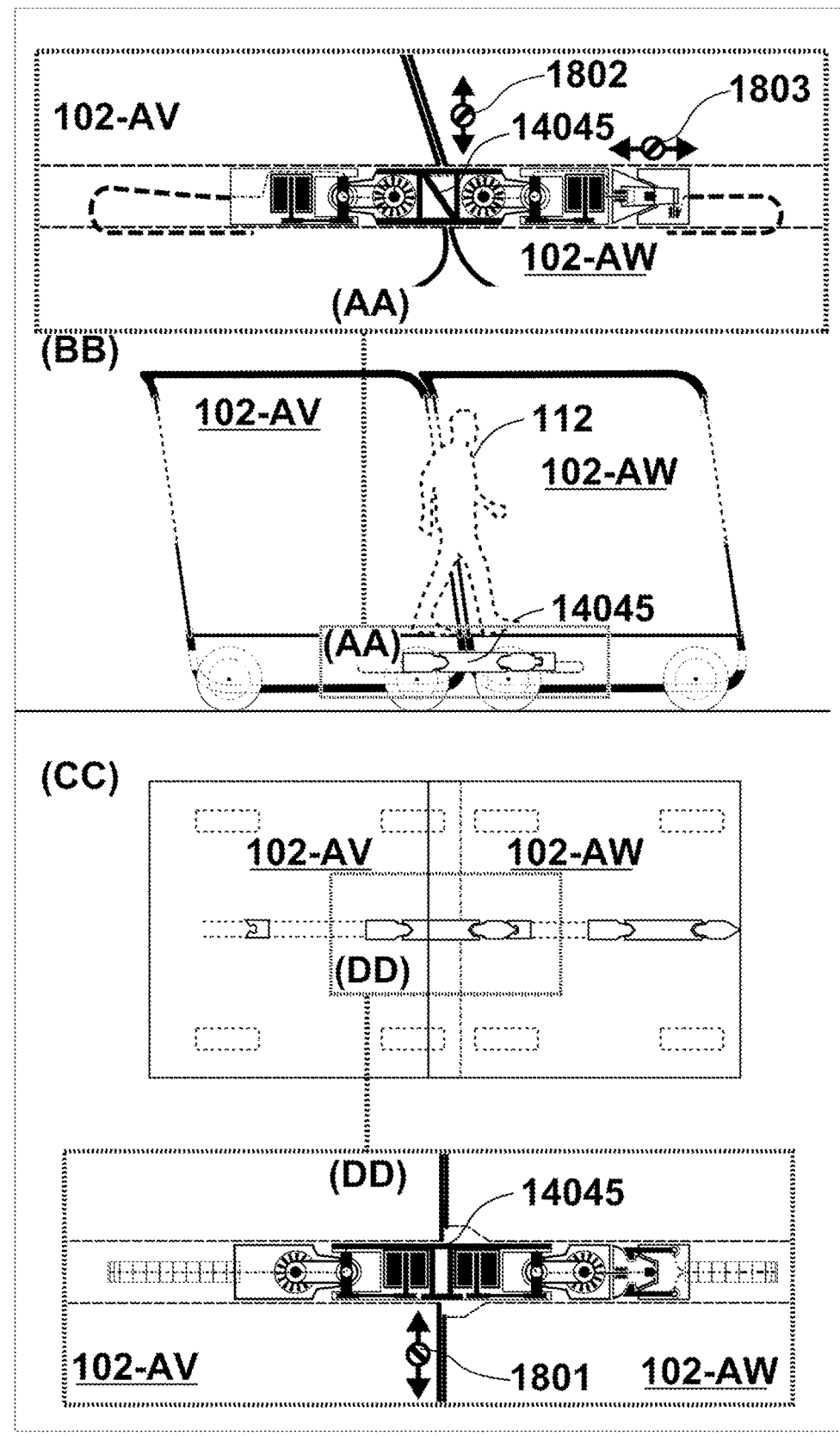

An RCVA 101 has two or more IVs, e.g., 102-B, C, selectively coupleable to each other; wherein at least two of the plurality of IVs 102-A, 102-B each comprises: a chassis 5, having a plurality of wheels 8, and having a first end 42 and a second end 44, as shown in FIG. 13; at least one independent vehicle system of an energy storage system 17, an active suspension system 11, a propulsion system 10, a braking system 50, and a steering system 60, as shown in FIG. 13; a coupling 110 disposed in the first end 42 or the second end 44 of the chassis 5; a mated coupling disposed in an end of the chassis opposite of that for the coupling: means for communicating between the at least two independent vehicles; and wherein: at least one of the wheels includes a steering mechanism coupled to the chassis; and the coupling is selectively engageable with a mated coupling of another independent vehicle 102-B. In one embodiment, the two or more IVs 102-B, C in an RCVA 101 are rigidly coupled together 102-B, 102-C with zero degrees of freedom of movement 1801, 1802, 1803 as shown in FIG. 18 with respect to each other; and each of the plurality of independent vehicles is selectively disengageable, as shown in FIG. 1.

In one embodiment, coupling 110 of a first independent vehicle 102-B and the mated coupling 28 of a second independent vehicle 102-C are engageable and disengageable while the first independent vehicle and the second independent vehicle are static or moving (see FIG. 37). Engaging and disengaging multiple IVs while moving saves time and energy resources compared to vehicles required to make stops for adding or discharging passengers and cargo. Means for communicating includes any form of wire, fiber, wireless or fiber-less communication to exchange control or logistical data to enable coupling of multiple IVs. Examples include GPS, wireless communication via cellular or WiFi, receiver and display communication via optical line of sight channel, or direct hard-wired communication through a communication adapter described hereinafter. Rigid coupling means coupling to absorb loads such that there is no appreciable articulation or movement in the X, Y, and Z axes.

Figure 16:
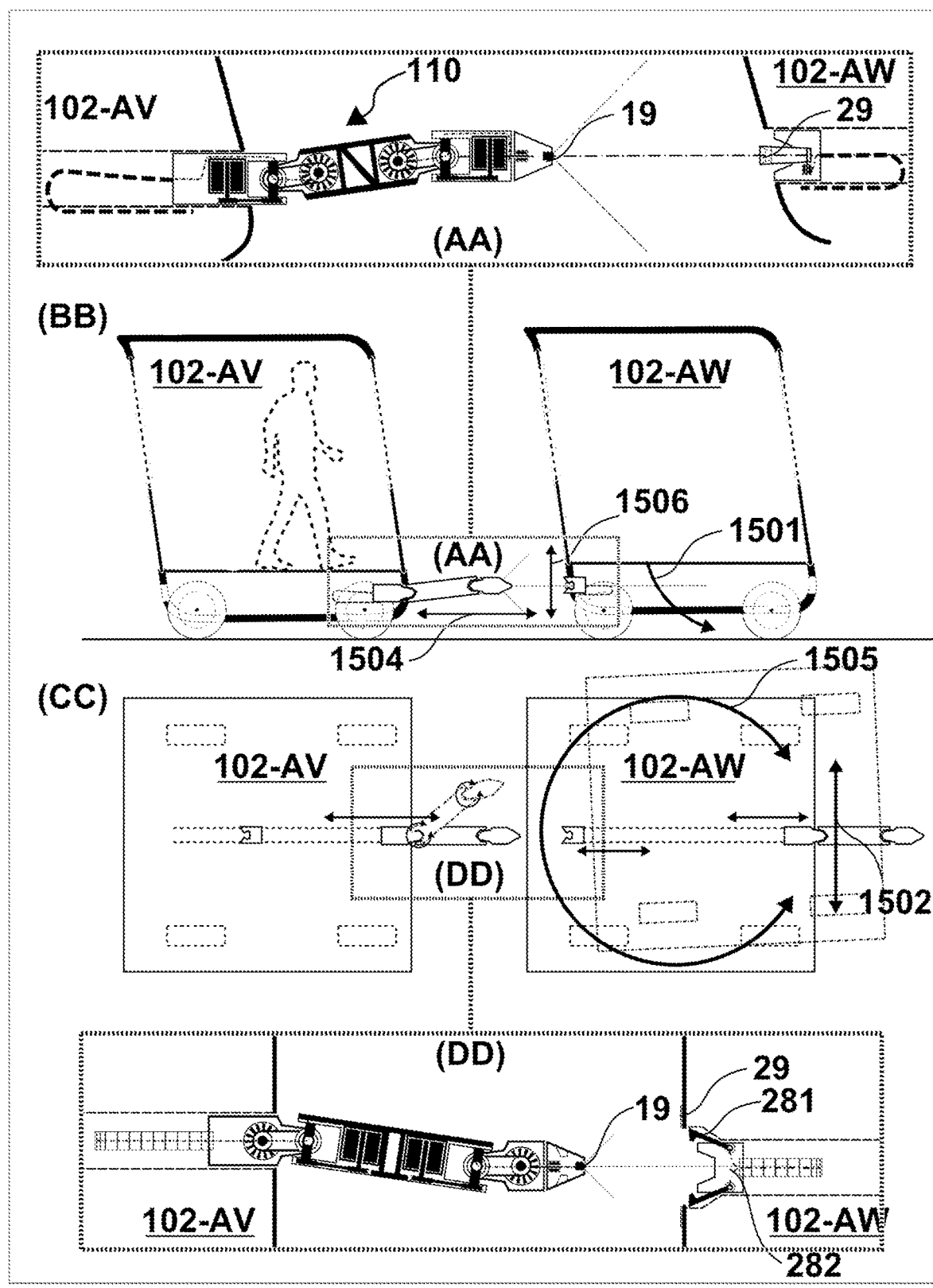
FIGS. 16-18 illustrate the coupling and decoupling of two independent vehicles, according to one or more embodiments.
Figure 17:
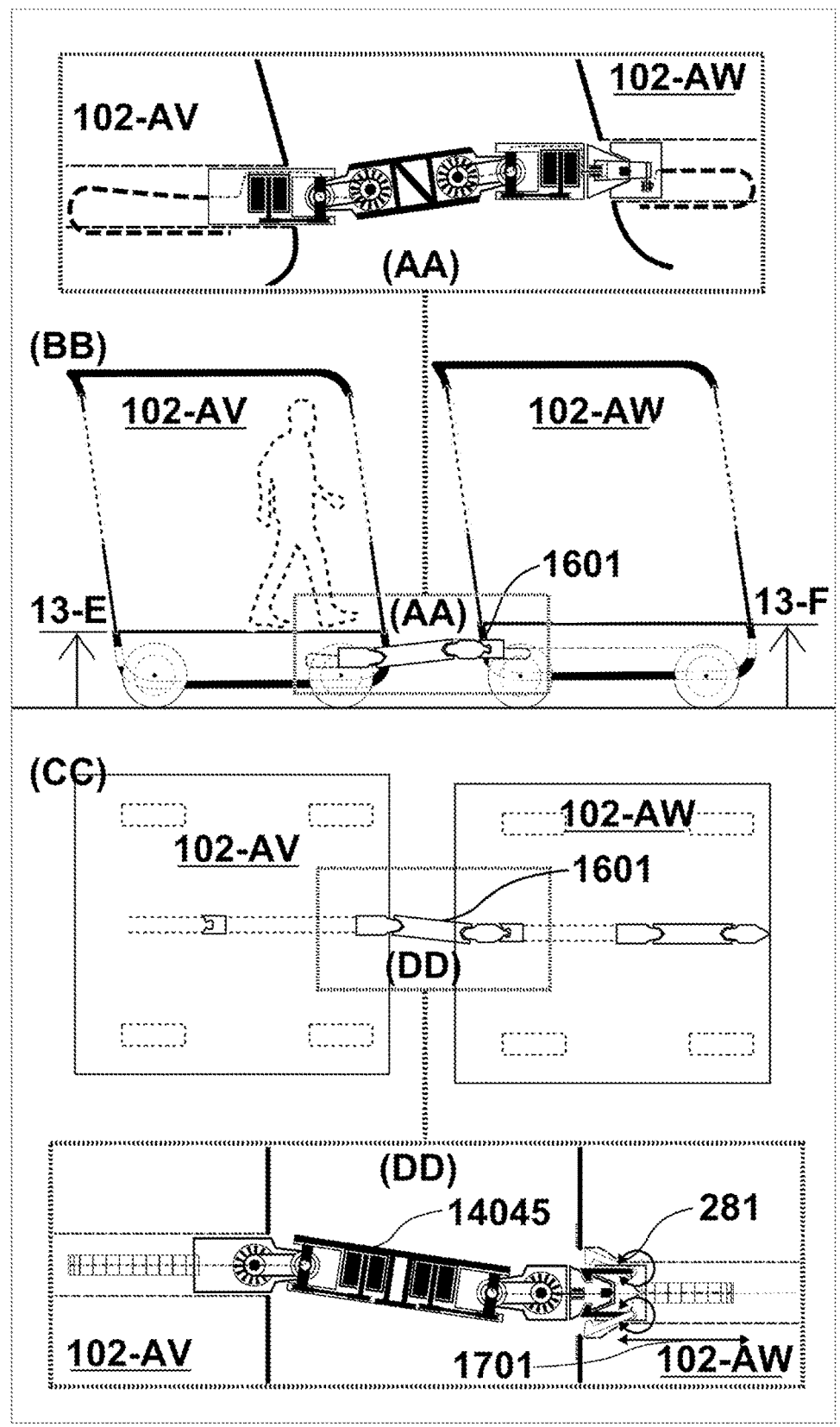

In another embodiment, an RCVA 101 includes a plurality of IVs coupleable to each other wherein each of the at least two of the independent vehicles includes an active suspension configured to receive instructions; and the active suspension of each of the at least two independent vehicles is configured such that a position of each of the two independent vehicles match at least two dimension. In this embodiment, two IVs can engage and couple with each other when the two IVs that are performing the engagement have active suspension. One or both of the two IVs can have additional IVs rigidly connected thereto without active suspension because the IV with active suspension can compensate for this deficiency. FIGS. 16-18 provide exemplary engagement sequences.

In another embodiment, RCVA 101 includes a subset of at least two of the rigidly coupled IVs, e.g., 102-G, C, wherein each has a front door 35-A and a back door 35-B, and the back door of a first independent vehicle aligns with a front door of a second independent vehicle. In this scenario, the back door and the front door are selectively operable to allow movement of at least one of passengers or cargo between the subset of independent vehicles, as shown by passenger 112 moving between IVs 102-B and 102-C. In another embodiment, an RCVA 101 can include a subset of two IVs that only have a single set of mating doors, e.g., a first IV with an opening door on the back face of the IV, and a second IF with an opening door on the front face of the IV, where the two sets of doors mate and face each other.

In one embodiment for RCVA 101, a first independent vehicle 102-C in a primary direction of locomotion of the system is designated a lead independent vehicle, where the lead independent vehicle transmits instructions to a balance of the independent vehicles in the system 102-B; and the instructions include a control for at least two of the following systems of the balance of the independent vehicles in the system: the energy storage system, the active suspension system, the propulsion system, the braking system, the active suspension system and the steering system. Thus, in the present embodiment, IV 102-C would transmit control information for two of the vehicle systems such as brake system information and active suspension information for route travel or for road conditions, e.g., pothole 100-D.

In one embodiment, one IV can be an accessory-type of independent vehicle that is rigidly coupled to an existing plurality of rigidly coupled individual vehicles. In particular, the accessory independent vehicle provides services to passengers or cargo in at least one of the independent vehicles in a given plurality of rigidly coupled individual vehicles. The accessory independent vehicle is not primarily for transport of passenger or cargo; and the accessory independent vehicle is selectively engaged and disengaged with the existing plurality of rigidly coupled individual vehicles. Examples of an accessory, or service IVs include, but are not limited to an energy storage system vehicle (for charging or replacing energy storage on individual IVs, an entertainment system vehicle; a personal hygiene system vehicle, a cargo vehicle, a business systems vehicle, and a food preparation service vehicle; and sleeping berth vehicle; an exercise vehicle; a utility vehicle, alcohol service vehicle, retail goods shopping services, exercise and workout services, business and equipment services, visual entertainment services, etc. The service vehicles could hop from RCVA to RCVA in short order to provide an efficient variety of serial services, either ad hoc or on demand, without stopping the RCVA. This is essentially bringing the services to a concentrated set of interested consumers, instead of individual consumers congesting roads driving to multiple different service locations desired in a normal day. Service vehicles can attach to RCVAs that have the highest on-demand requests, e.g., mobile requests, thus providing the most profitable, and efficient connections (the highest amount of services consumption to the most people with the least amount of IV connecting and disconnecting). Additionally, IV services can be provided by service vehicles, such as repair, upgrades, and replenishment of consumables such as "battery swapping in motion vehicles". Alternatively, an accessory vehicle, such as an energy storage system vehicle for charging one or more IVs, is articulately coupled to an IV or a RCVA.

FIGS. 2, 3 and 4 illustrate the closed sliding doors 35, and opened sliding doors position 135, according to one embodiment of the present invention. Active suspension of FIG. 13 allows variable heights 13-A to 13-D from one to all four corners, depending on the embodiment and which wheels have the active suspension.

FIG. 5 illustrates a top half view/half section of an embodiment of a self driving autonomous vehicle. In one embodiment, the internal structural frame, aka chassis, 5 of an IV, supports the compartment 80 and the drive train, though a unibody metallic or composite monocoque construction is also envisioned. In another embodiment. ⅗ mm rectangular beams structure, steel and/or aluminum can be used to construct the internal structural frame 5. In another embodiment, exterior side frame 3 comprises a strip all around the side of an IV. Further, an IV, in another embodiment, can have vehicle headlights 18, or can comprise no headlights, depending on the configuration and requirements.

Figure 6:
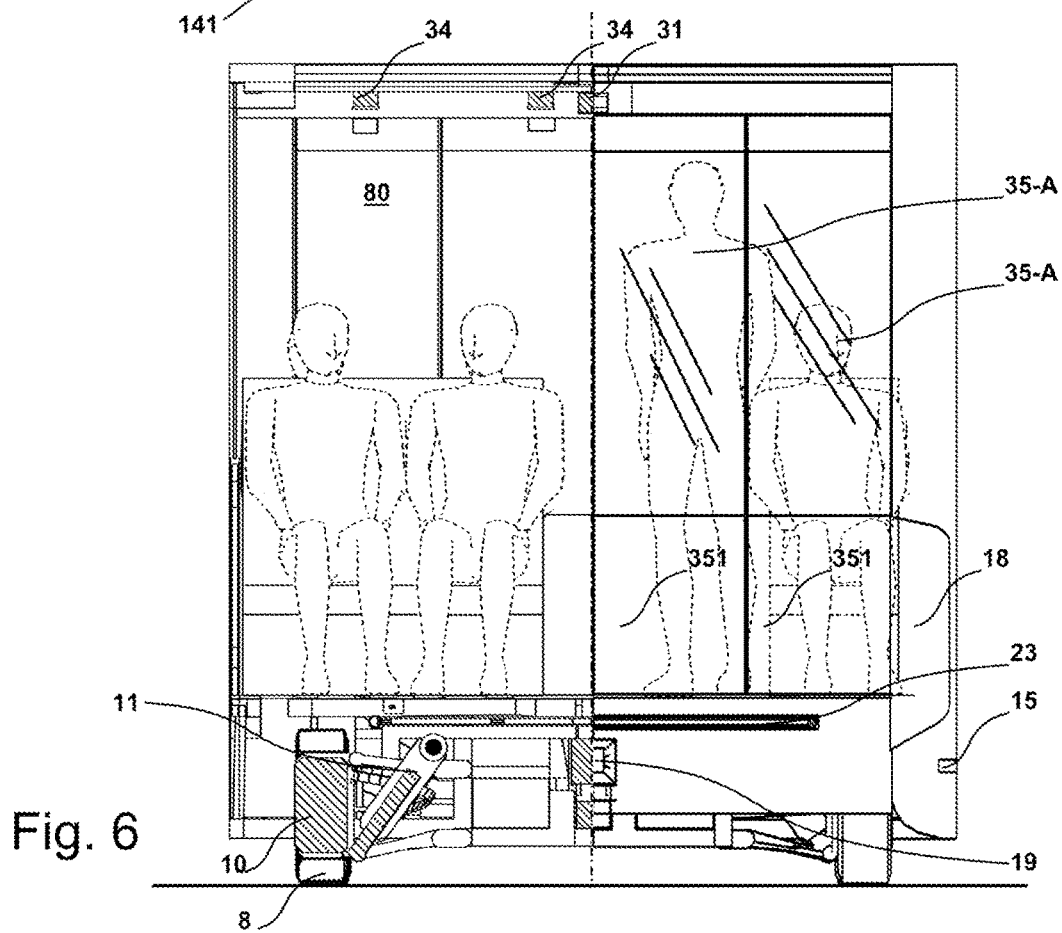
FIG. 6 illustrates a frontal half view/half section of an independent vehicle, according to one or more embodiments.

FIG. 6 illustrates a frontal half view/half section of an IV, according to one embodiment of the present invention, describing front sliding doors linear actuators 34 of an IV, according to one embodiment of the present invention. (This is further disclosed while describing FIGS. 19, 20 and 21 herein.)

Figure 30:
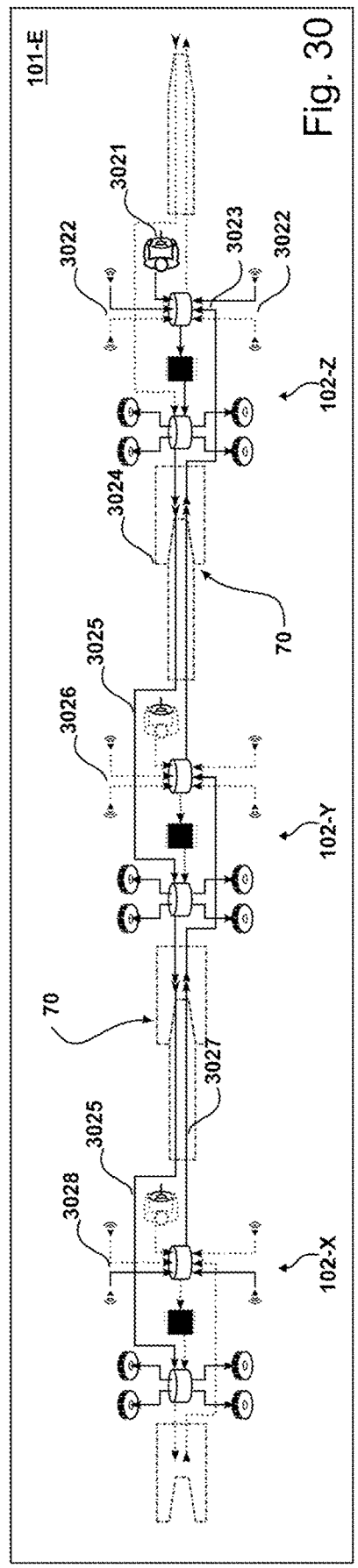
FIG. 30 is a communication and control system within a rigidly coupled vehicle assembly, according to one or more embodiments.

In one embodiment, an IV comprises a detection system using light from a laser with the principle of a radar ("Lidar") 31 (or equivalent self driving road scanning radar and/or sensors system that can detect objects, distance, road conditions, etc.). The front Lidar 31 can scan the road for obstacles and the IV can navigate accordingly. In one embodiment, an IV comprises a thicker reinforced bottom part 351 of the sliding doors for frontal collision resistance and protection. In another embodiment, the top part of an IV is made of safety laminated glass. An IV, in one embodiment, comprises angular sensors and cameras 15 coupled to a processor, aka central processing unit ("CPU"), 2095 as shown in FIGS. 13, 29 and 30 as an integral part of the self driving system. An IV can also comprise retractable stairs 23 and an active suspensions system 11 to stabilize the vehicle and limit the relative movements among coupled IV to reduce mechanical stress on the central part of the robotic connection arm.

Active suspensions can also improve stability when the IV is suddenly stopped or is navigating through tight curves. In another embodiment, an IV can be rear wheel driven, front wheel driven, or a combination thereof. In another embodiment, an IV is all-wheel-drive. In yet another embodiment, an IV can comprise any combination of wheels, e.g., 3, 4, 6, 8, etc. In one embodiment, joining system 141 includes a tracking camera, aka receiver for data, 19 that can receive an image from, and optically track data from another vehicle.

Figure 7:
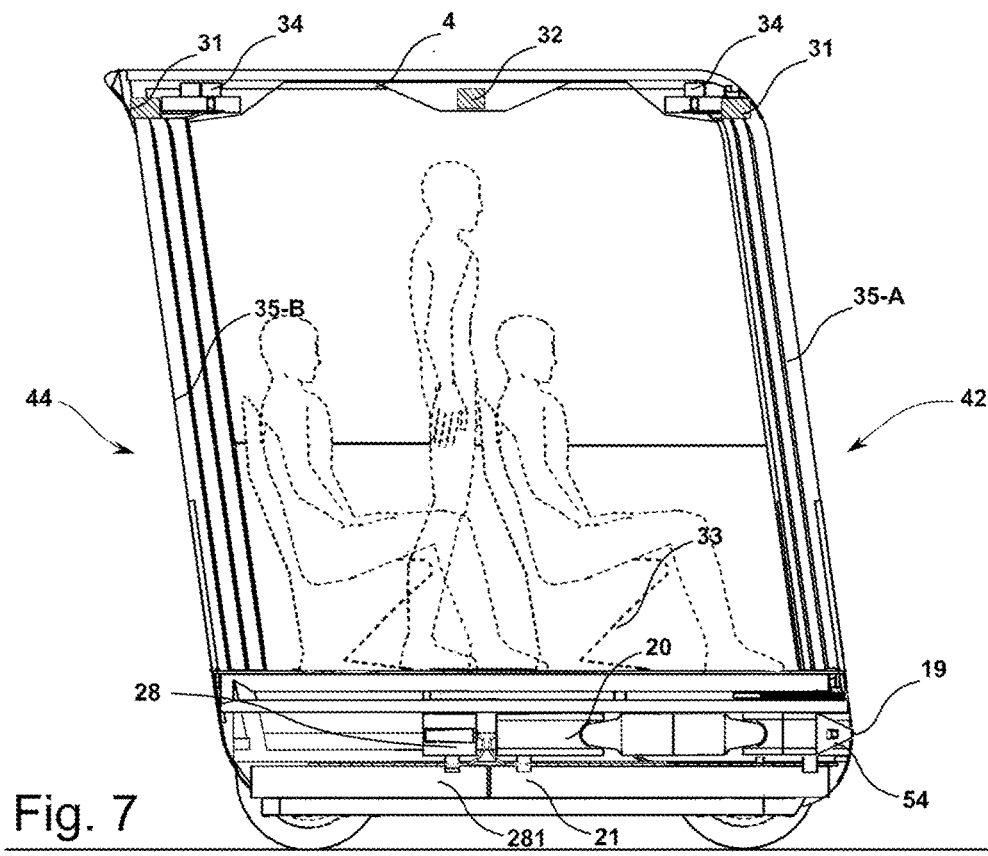
FIG. 7 illustrates a side view of an independent vehicle with a retracted robotic arm used to couple with another self driving vehicle, according to one or more embodiments.
Figure 14:
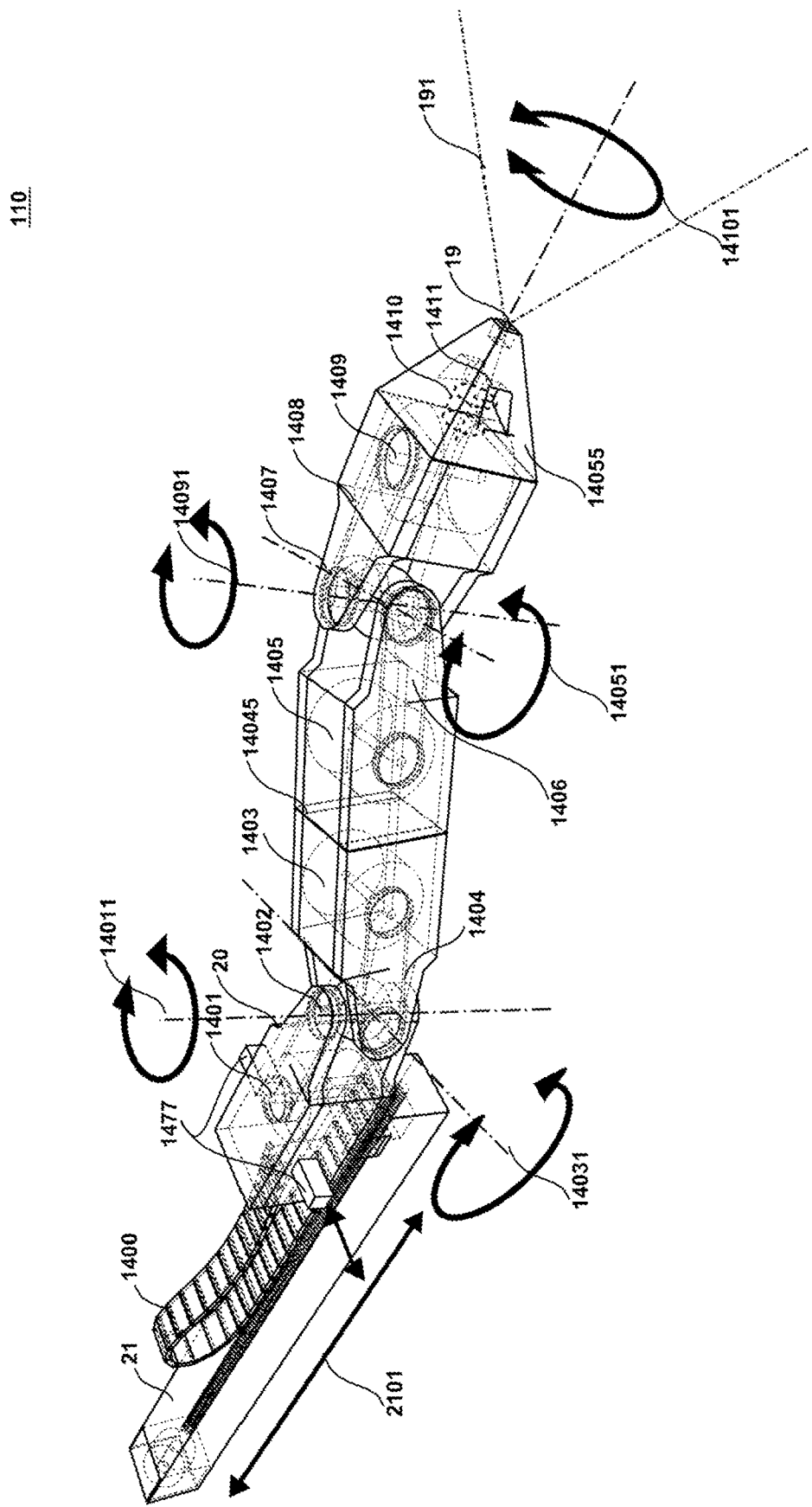
FIG. 14 illustrates a various components of a robotic arm used to couple with another independent vehicle, according to one or more embodiments.

FIG. 7 illustrates a side view of a self driving autonomous vehicle with a retracted robotic arm 54 used to couple with another self driving vehicle according to one embodiment of the present invention. In one embodiment, an IV comprises ceiling protection 4 that covers the doors opening system and lateral sensors. An IV can also include lateral sensors/cameras 32 (as needed by a functional self driving system). IV can further include back linear actuator 281 that drags and pulls the receptor portion 28 of the joining system. Similarly, an IV can include a front linear actuator 21 that drags and pulls the front part of the joining system (e.g., the front robotic arm). Stabilizing tapered pins/receptacles (not shown) with bushings disposed in corners of IVs front 42 and back 44 face can provide torsional stability when multiple IVs are engaged. Base component 20 of robotic arm of the joining system can slide in/out of the vehicle, while remaining mostly inside IV during non-use to avoid injury or damage, and during operation to guarantee structural support to the rest of the arm outside. Additionally, entire coupling 110 is selectively retractable into the chassis from a first position 54, as shown in FIG. 7, to a second position 56 in subsequent FIG. 8. For example, as shown n FIG. 1, IV 102-B, C, coupling system 141-B has less than several inches, at best, of coupling 110, as shown in FIGS. 14 and 18, exposed between multiple IVs.

First end 42 of the independent vehicle has a surface profile 84 that matches, or is mateable, with the surface profile 82 of the second end 44. Mating surfaces of coupled independent vehicles enables the vehicles to fit tighter as a single rigid unit, through which passengers and cargo can move without noise, wind, elements, or hazardous open space therebetween. Mating IVs are interlocking, or conformal, having a complementary mirror or parallel image such that the front face is an inverse of the back, e.g., flat, or patterned, or convex and concave in two (cylindrical) or three (spherical) dimension in different embodiments.

A first door 35-A is disposed in the first side of the chassis and a second door 35-B is disposed in the second side of the chassis. The first side is the front portion of the independent vehicle for the principal direction of locomotion, while the second side is the opposite of the first side. The first and second doors permit selective ingress and egress of passengers or cargo from the independent vehicle, but only when the vehicle is stopped, since no other IVs are coupled thereto.

Figure 8:
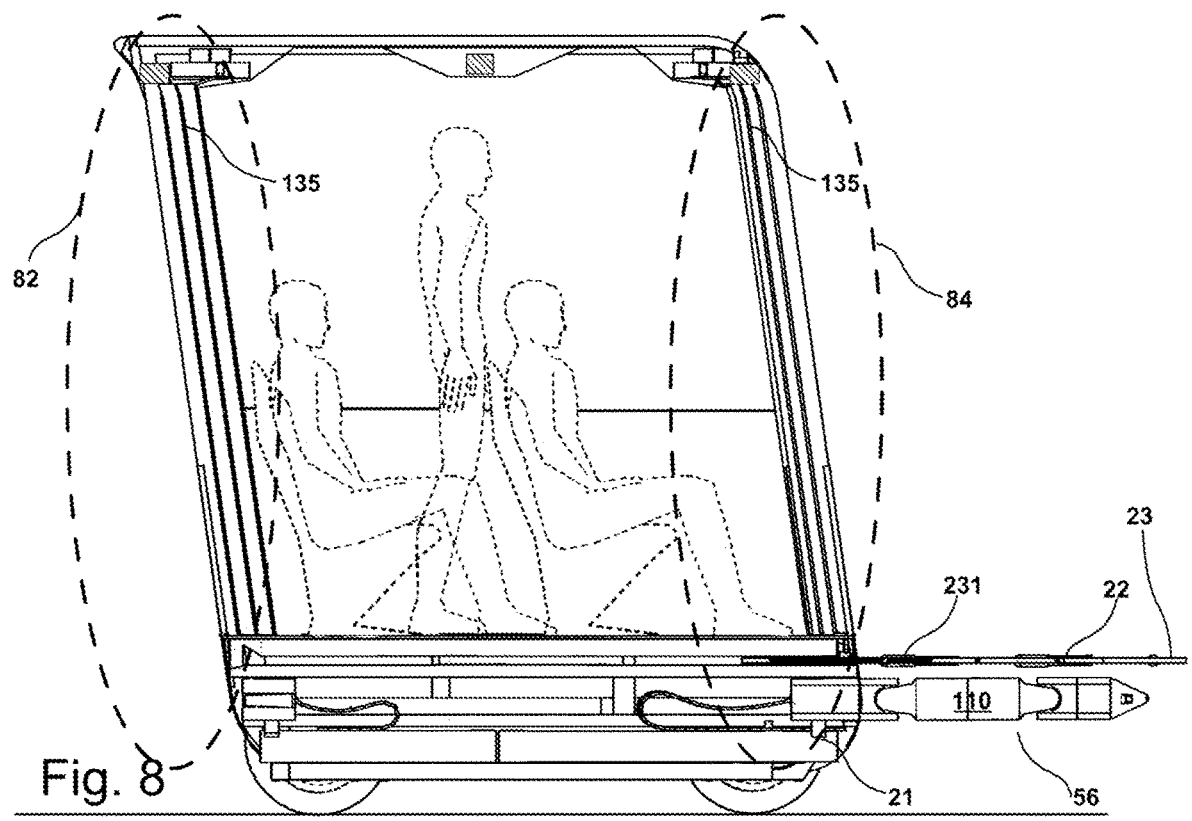
FIG. 8 illustrates a side view of an independent vehicle with an extended robotic arm used to couple with another self driving vehicle, according to one or more embodiments.

FIG. 8 illustrates a side view of a self driving autonomous vehicle with an extended robotic arm used to couple with another self driving vehicle, according to one embodiment of the present invention. As can be seen the position of front linear actuator 21 moves towards the front to extend the robotic arm of the joining system.

In one embodiment, retractable stairs 23 are provided and comprise a reinforced component 231 that can be configured to avoid stairs flexing when passengers are on the stairs 23. When the IV is in motion, the stairs are retracted inside the vehicle. The retractable stairs fold out to let people step in, when the IV is stopped. In one embodiment, retractable stairs are reinforced to avoid passengers' weight/movement to excessively flex the stairs 23, while in use by a passenger. Retractable stairs 231 can be provided by implementing lateral stair actuators 22 to perform in line retraction of the retracting stair steps.

Figure 9:
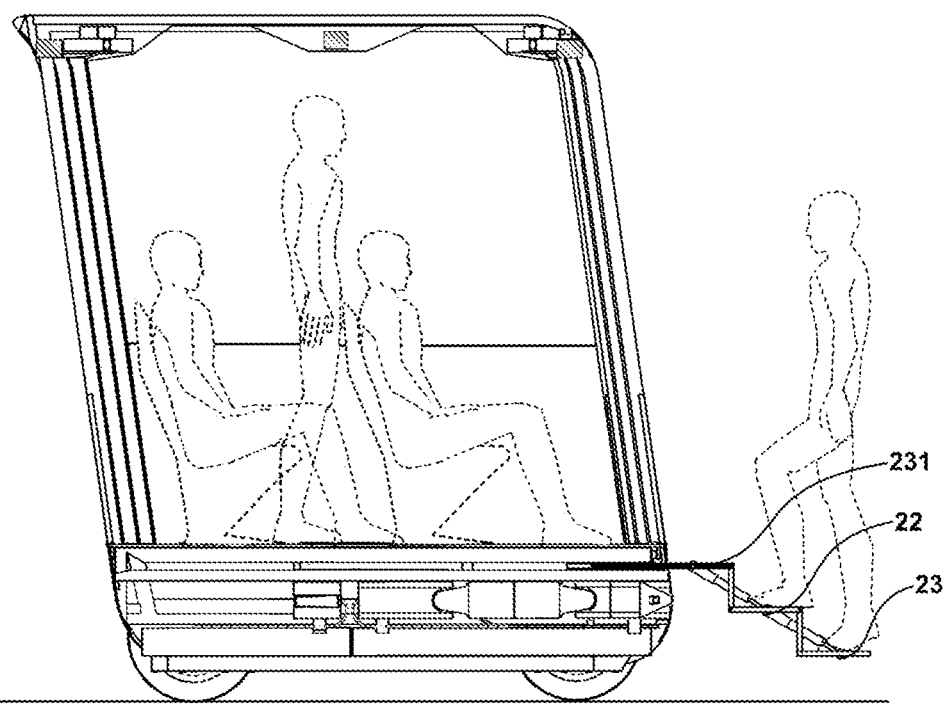
FIG. 9 illustrates a sectioned side view of an independent vehicle with an extended stair case, according to one or more embodiments.

FIG. 9 illustrates a sectioned side view of a self driving autonomous vehicle with an extended stair case 23, according to one embodiment of the present invention. As illustrated stair case is fully extended and is implemented using lateral stair actuators 22 exposing stair step platform 23 that can be used by a passenger to get into the IV.

Figure 10:
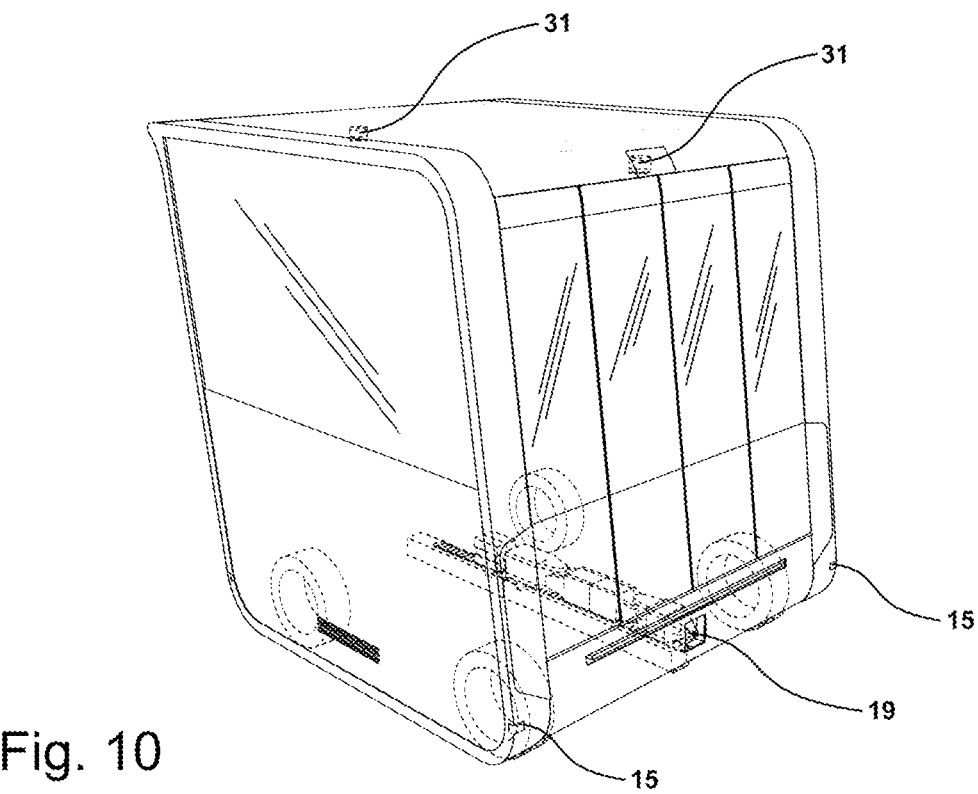
FIG. 10 illustrates a prospective view of an independent vehicle, according to one or more embodiments.
Figure 11:
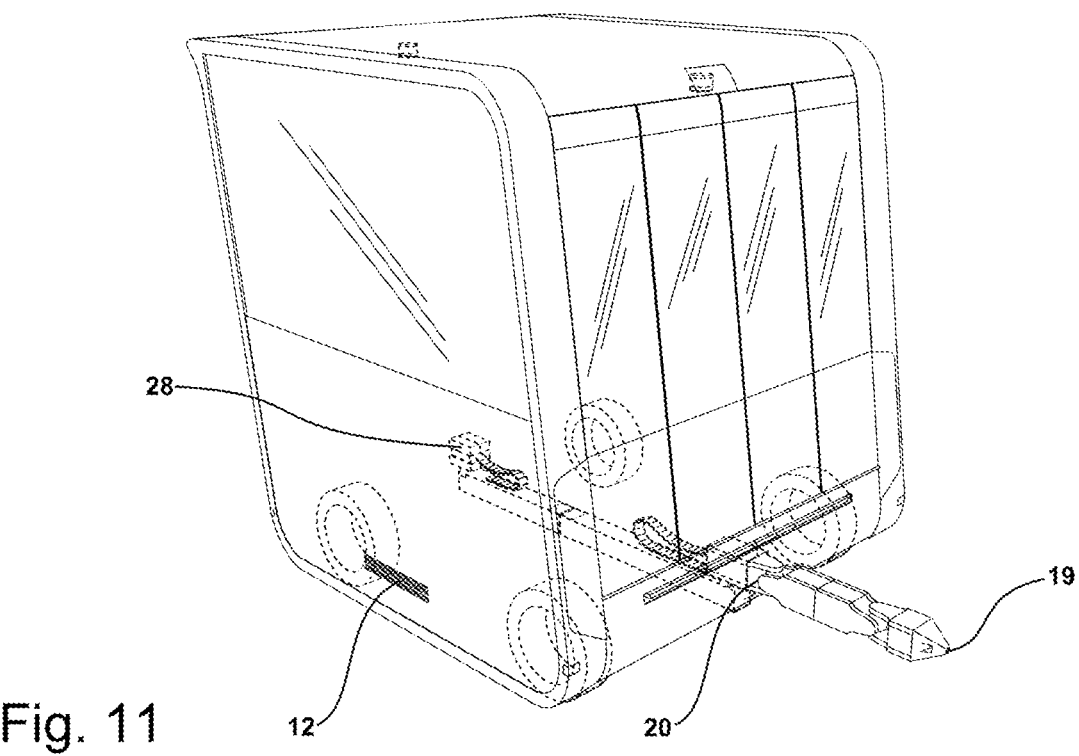
FIG. 11 illustrates a prospective view of an independent vehicle with an extended robotic arm use to couple with another self driving vehicle, according to one or more embodiments.

FIGS. 10 and 11 are exterior views showing extended and retracted coupling positions and showing receptor 28, and with cooling system for air conditioning and external ventilation outlet 12, as implemented in one embodiment of the present invention. Also shown is camera 19, base component of coupling (robotic arm) 20, angular sensors and cameras 15, the latter providing input to a processor for safety and SDAV functions.

Figure 12:
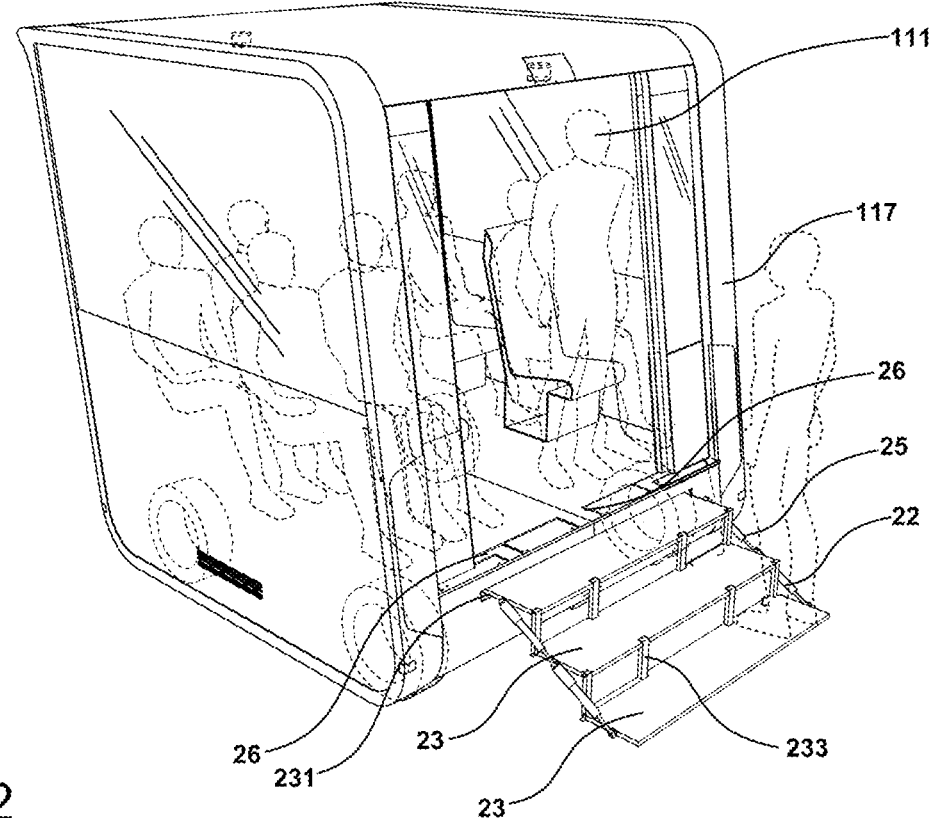
FIG. 12 illustrates a prospective view of an independent vehicle with an extended stair case, according to one or more embodiments.

FIG. 12 illustrates a standing passenger 111 on the IV. In one embodiment, an advantage of a high ceiling IV is to facilitate free movement of passengers inside the IV. Thus, in this manner, passengers can walk and stand inside the IV. Also, as illustrated, passenger 117 can step on to the IV using the retractable stairs. In one embodiment, the passage and steps are wide enough to let people get on and off at the same time. In another embodiment, sliding tracks 26 can be configured on the floor to stabilize the lower part of the doors when they are opening or closing. In another embodiment, lateral stairs actuators 25 and 22 can be configured to perform in line retraction of the retracting stair steps. In another embodiment, Vertical rotating supports 233 can be configured to provide stability (in conjunction with lateral actuators) when the staircase is fully extended.

FIG. 13 is an exploded-view illustration of an exemplary IV, according to one embodiment of the present disclosure. IV includes lateral glass windows 1, lower part reinforced vehicle body cover 2, steel reinforced front cavity 6 to support and stabilize the robotic arm front joining system, back bumper plastic frame 7, upper and lower support and control arms 14 for the suspensions and wheel system, front bumper plastic frame 16, battery pack 17 that can slide outside the structure, for example to be substituted in motion by a battery-swap vehicle, linear actuator 24 that slides the retracting stairs inside and outside, rear lights 27, optical tracking tag 29 (that can be tracked by 19) to allow the robotic arm and the back vehicle to align, and lateral electric plug 1301 to charge the batteries, as implemented in one embodiment of the present invention. In another embodiment, any of the above components can be optional in an implementation of an IV. In one embodiment, a long and thin battery pack could slide from one vehicle to another through a front/back cavity (when vehicles are connected). A specific "battery-cartridge-support vehicle" can be used to intake the discharged battery, slide it on the side and refill the cavity with a full-charged battery from a "cartridge" of batteries stored in this "battery-cartridge-support vehicle".

FIG. 14 illustrates the front part of the joining system. In one embodiment, the joining system comprises a retractable robotic arm 110 with six Degrees of Freedom ("DoF") that can slide out from the front of a vehicle 102, shown in subsequent FIG. 15. In another embodiment, the system includes a camera 19 on the front tip that optically tracks the marker position 29 of the back cavity lodge 28 of the vehicle in front, aligning with it, and entering that cavity, as shown in subsequent FIG. 15. The six DoF can allow an initial misalignment and vibrations between two coupling IVs. When the robotic arm points inside the cavity of the front vehicle, internal gears pull towards inside the vehicles to join the respective ends of the robotic arm to the coupling IVs. In doing this, the vehicles gradually align themselves up to complete stabilization and front/back contact of the vehicles. In one embodiment, the central part of the robotic arm acts as a rigid stabilizer bar limiting minor and/or sudden misalignments due to bumpy roads, or fail in the among-vehicles-synchronized steering and active suspensions system.

Coupling 110 includes a plurality of links 20, 14045, 14055 coupled to each other to mate with a mated coupling; and wherein: the plurality of links selectively provides a variable degree of freedom ranging from zero degrees of freedom as shown in subsequent FIG. 18 to at least three degrees of freedom 14011, 14031, 14091, 14051, 14101, and as shown in subsequent FIGS. 16 and 17.

In one embodiment, the robotic arm of the joining system is configured as a motorized double universal joint such that each axis of freedom of the joints is available. In one embodiment, the robotic arm is configured to track and align to the back cavity receptor of the IV to join two IVs. Thus, the physical connection can be performed even when the IVs are not perfectly aligned. In one embodiment, the position/rotation feedback of the arm, while tracking and/or joining the back cavity receptor, provides data to properly modify, set and synchronize relative movements (speed sync, steering sync, suspension height and active suspensions sync of the IVs to perform a smooth and seamless at-contact physical connection.

In one embodiment, the robotic arm can be motorized for three purposes: (i) to align to the tracked back tag (and so to the back receptor cavity), (ii) to provide precise position/rotation feedback to retro-align the IV itself to the front one and (iii) to compensate minor un-compensated relative forces/movements during the physical joining procedure between two IVs.

As illustrated, first degree of freedom 2101 of the robotic joining arm 110 is shown providing the capability of sliding back and forward. In one embodiment, up to six electric motors can be used to provide various degrees of freedom (DoF) (e.g., 6-DoF). Furthermore, power and/or control cables 1400 can be provided that can be configured for motor and feedback control and the data cable for the tip of the camera sensor. In one embodiment, motor 1401 can provide the horizontal plane rotation 14011 of the middle segment of the arm 14045. In another embodiment, motor 1401 can provide vertical plane rotation. As an example, when two IVs are about to join, while running on a straight road, the horizontal relative side movements of the IVs in the same lane are generally going to be very limited. Further, because the IVs are self-driving, they can be programmed to maintain the perfect center of a lane. Thus, the gears system of the motor is set to provide more precision, steadiness and torque (needed when force is needed to pro-actively align the vehicles each other).

A 2nd DoF 14011 is rotation on Z axis, so on the horizontal plane for the middle segment of the arm. 1402 represents the pivoting center of rotation for motor 1401. In one embodiment, the pivoting center is connected with the motor with a belt gear. In one embodiment, motor 1403 (and related gears for optimal speed/torque) provide vertical rotation movement of the middle section of the arm. In one embodiment, motor 1403 is optimized for torque force and precision by motor compared to speed. The rotations of the robotic arm can compensate for the vertical movements of the IVs when they are about to join. In one embodiment, gear belt 1404 can be configured to provide torque from motor 1403 to the cardan joint 1407, aka universal, and alternatively constant velocity joint.

A 3rd degree of freedom 14031 is rotation on X axis, on the vertical plane for the middle segment of the arm. A highly reinforced middle section 14045 of the robotic arm 110 provides structural support. This reinforcement provides stability and structural integrity, when two IVs are rigidly joined at contact, by handling the vertical, lateral and torsional forces involved between the two connected vehicles. Generally, any motors in the robotic arm can be configured programmatically to provide adjustments for sudden movements. Motor 1405 is configured to provide movement capabilities and gear belt 1406 is provided to transfer torque from motor 1405 to the cardan joint A 4th degree of freedom 14051 is rotation on X axis, on the vertical plane for the middle segment 14045 of the arm. The two-axis cardan pivot 1407 between mid section of the arm 14045 and the tip part 14055 of arm. Motor 1409 provides horizontal rotation to the tip of the robotic arm, and gear belt 1408 is configured to transfer torque from motor 1409 to the cardan joint. Generally any motor (except those present in the tip of the robotic arm) in the robotic arm is configured to provide torque and not speed. In another embodiment, motors present in the tip of the robotic arm are configured for speed, especially those providing movement/rotation on the Y axis.

A 5th degree of freedom 14091 is rotation on Z axis, on the horizontal plane for the middle segment of the arm. This horizontal rotational degree of freedom is associated with the 1st degree of freedom (including horizontal rotation) to allow tracking the physical joint even on curve roads or corners. Thus, these junctions are also responsible for the main horizontal rotation among physically joined vehicles at distance in case of tight corners and/or long multiple vehicles convoys. In one embodiment, motor 1410 provides Y axis vertical rotation to the very tip of the robotic arm. Degree of freedom 14101 represents the 6th degree of freedom, rotation on Y axis, the vertical plane of the very tip of the arm. Front tracking camera 19 can have field of view 191 to track the back tag of the vehicle in front 29. In another embodiment, multiple coupling robotic arms are used in IVs, either symmetrically (all arising from one vehicle), split (one arising from each a lead and a trailing IV), and simultaneously or serially deployed.

Figure 15:
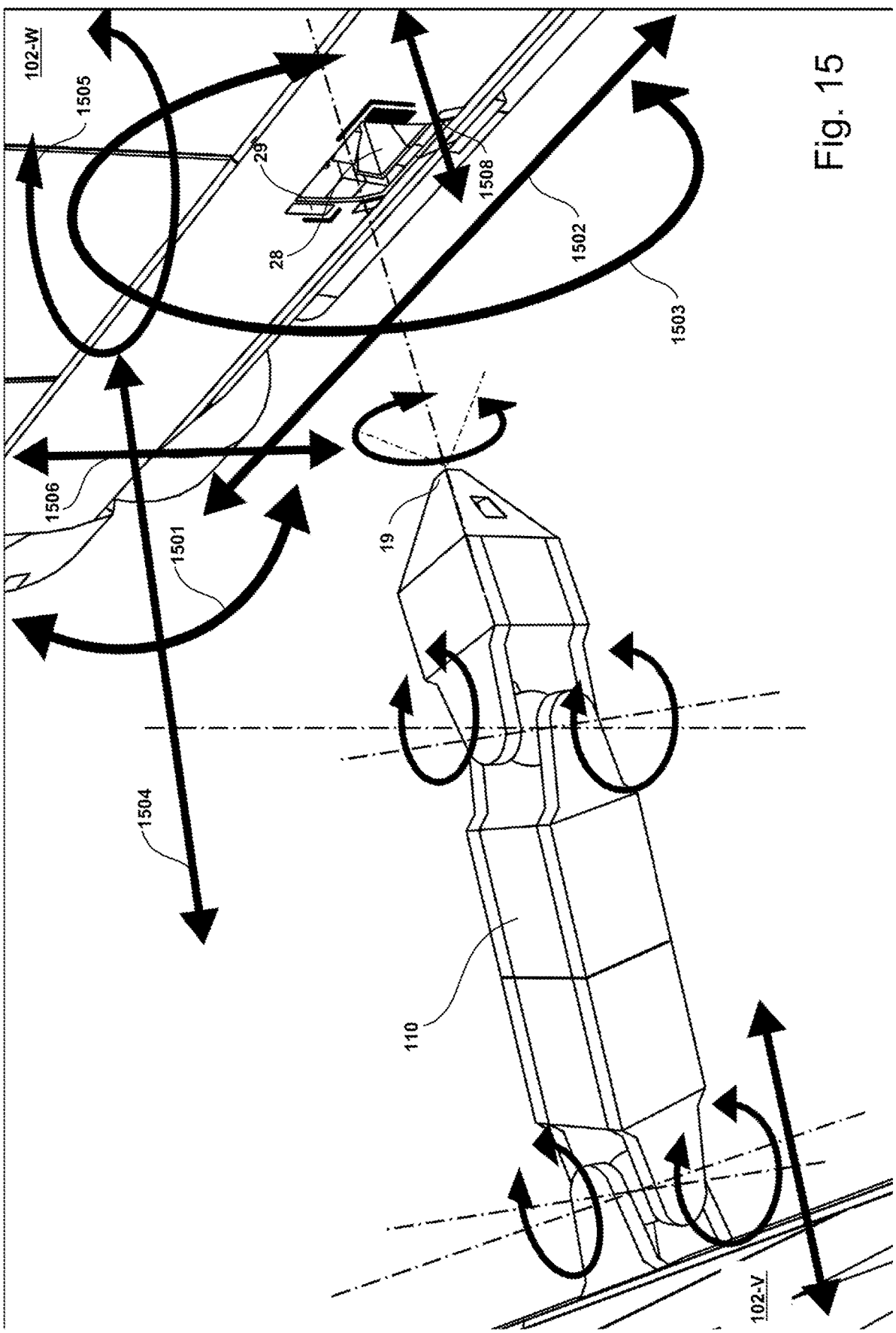
FIG. 15 illustrates the various degrees of freedom exhibited by a robotic arm of an independent vehicle that is used to couple with another self driving vehicle, according to one or more embodiments.

FIG. 15 illustrates how the six degrees of freedom of the robotic joining system front arm 110 of trailing vehicle 102-V allow it to track properly the back visual tag 29 of the vehicle in front 102-W, compensating the lateral and longitudinal 1504, vertical 1506, lateral 1502, roll 1503, pitch 1501, and yaw 1505 movements of the vehicle being tracked 102-W, while 1508 represents the back receptor longitudinal translation. Receiver, aka tracking camera, 19, as shown in FIGS. 11, 14, 15, 16, 24, 29, and 38 in trailing vehicle 102-V is configured to receive a signal from a display 29, as shown in FIGS. 13, 15, 16, 29, and 38 on another independent vehicle 102-W or from an external source, such as a wireless source, wherein the signal is at least one of: a state of availability to connect via the coupling, a relative position and velocity, acceleration, and a road condition 100-D, and alternatively, the energy storage system, the propulsion system, the braking system, and the steering system. The vehicle also includes transmitter 29 coupled to display a signal, wherein the signal is at least one of: a state of availability to connect via the coupling, a relative position and velocity, acceleration, and a road condition. For two IVs to couple together as an RCVA, at least one of the IVs has a transmitter and at least one of the IVs has a receiver. In another embodiment, all IVs that form a RCVA have both a transmitter and a receiver.

In one embodiment, IV's 102-V joining system 141 includes a tracking camera, aka receiver for data, 19 that can receive an image from, and optically track the receptor portion 28 of the joining system. In one embodiment, the optical tracking can be performed using a tag on the back of an IV on receptor portion 28, such as a quick response ("QR") code two-dimensional matrix barcode as a machine readable optical label with fast readability and higher data storage capacity. A library of known QR codes is provided to IVs with an ability to couple or be coupled to, so that they can communicate using the same language. For example, library requests and replies and statuses can include ability to connect, state of any vehicle system, road conditions, destination and route information, etc. The optical line of sight provides for greater security between two vehicles planning on coupling. That is, the line of sight mutual physical feedback/communication is not hackable remotely, as is RF wireless communication. Other embodiments for communication between vehicles can use a variety of bandwidths of line-of-sight optical transmission FIG. 16 illustrates the side view (AA and BB) and top view (CC and DD) as the retractable robotic arm of trailing IV 102-AV extends towards the back of a leading IV 102-AW. As illustrated, the robotic arm can be configured to track and align with front IV 102-AW, compensating any position or rotation differences between the two IVs 102-AV, AW. Figure (AA) shows camera 19 receiving an acknowledgement of availability to connect, and at least one of logistic information such as position (X, Y, and/or Z linear measurements, and/or yaw, roll, and/or pitch rotational information in one embodiment, and all these values in another embodiment), speed, and/or road condition information. Figures (AA), (BB), (CC), and (DD) show a typical scenario of having nearly no perfect alignment in any dimension or rotation, but instead has difference in vertical height 1506, longitudinal distance 1504, pitch 1501, yaw 1505, and lateral offset 1502. These multiple misalignments necessitate the use of coupling 110 with multiple degrees of freedom.

Each independent vehicle includes: a locking means 281 to restrain the coupling extended from the independent vehicles when the coupling is engaged in the mated coupling of another independent vehicle, and includes a locking means 281, as shown in FIGS. 16-17 in the another independent vehicle to restrain the coupling received from the independent vehicles in the mated coupling of the another independent vehicle. For example, one embodiment implements mechanical locking hooks 281 that, when closed, lock and restrain the longitudinal degree of freedom, thereby allowing the front vehicle to tow the IV behind it, if the front IV provides propulsion, or thereby allowing the trailing vehicle to push the front IV, if the trailing vehicle is providing the propulsion. Actuators 282 selectively open/close the locking hooks 281. Other means such as hydraulic/pneumatic (piston), and electrical (solenoid) can be used to retain and lock the coupling.

The misalignment shown can be attributed to difference in roadway contours (curves, inclines, driveway, potholes, etc.) as well as different, excessive or uneven load in one or more IV. At a minimum, the X axis (lateral) and the Y axis (vertical) dimensions/alignment is needed for engagement. The z-axis (forward and back) will recede as the vehicles approach coupling.

In one embodiment, multiple IVs planning to couple adjust their active suspension to a nominal or default low vertical height, which would represent a maximum loaded IV, so as to avoid stressing an overloaded IV trying to elevate to an unobtainable height. If any dangerous situation, or unfeasible condition arises regarding an attempt to couple, the transmit/display 29 can indicate with a QR code, serial modulated code, etc. that such as non-connection criteria exists. This would then cause both IVs to discontinue the coupling process, and allow both IVs to simply travel independently, or until a more suitable coupling opportunity arises on different road conditions, or with different IVs. In one embodiment, a full handshake protocol exists so that both IVs planning to couple are aware of each other's status and intentions, and next steps. The handshake can include authentication, authorization, and accounting ("AAA") for any interaction. A full handshake protocol requires full duplex, or bi-directional communication. This in turn requires the front vehicle has a receiver 19-1 on the back side of the chassis, and a transmit/display on the front side of the chassis 29-1.

FIG. 17 illustrates a configuration in which IVs can physically couple and rotate even if not previously completely aligned each other, in one embodiment. This can be advantageous because the robotic arm can mutually stabilize and align the two IVs 102-AV, AW. Coupling is angled, or inclined at angle 1601, to compensate for the misalignment in the IVs. In one embodiment, this can occur even if two IVs are not able to communicate and share data among themselves (for example in case the vehicle in front has data connection problems, self-position sensors not working properly, is a discharged or defective vehicle already towed etc.). Further, no data connection is needed to perform the joining of the vehicles provides greater informatics safety. When physical connection between two IVs is achieved, the arm tip is locked and the system gradually aligns compensating the position/rotation shift among them, with the stabilizing help of the motors inside the robotic arm, and with adjustments in active suspension and steering from both IVs. This pro-actively decreases mechanical stress on the robotic arm and on the vehicles themselves, while the robotic arm provides feedback to its own motor rotational status. Furthermore, a double cardan robotic connection system can allow the vehicles to rotate or move freely, when necessary, without physically detaching the IVs. Linear actuator 1701 gradually retracts the back receptor part of the joining system of the leading vehicle. Thus, the yaw 1505 of IV 102-AW in FIG. 16 is now corrected in FIG. 17, though the height difference 13-E and 13-F of IV 102-AV and 102-AW still exists in FIG. 17 (BB).

FIG. 18 illustrates the state when two IVs 102-AV, AW are coupled rigidly. The central reinforced section 14045 of the robotic arm mechanically stabilizes the joined vehicles against any torsional or vertical/lateral movements. The hooks locking system 281/282 prevents longitudinal movement, while the coupling arm itself seated in the chassis of both IVs prevents vertical and lateral movement. In one embodiment, once coupled, the steering wheels (when present) of the trailing IV 120-AV (that is, all but the primary front IV 102-AW) are slaved to the lead IV 102-AW to avoid any unintentional movements of the following (secondary) IVs. The steering mechanism, in one embodiment, is electronically regulated via controller 2095, as shown in FIGS. 29 and 30, to be synchronized among the vehicles. Further, when necessary, digital data of the route can be shared via a communication adapter 110 in subsequent FIG. 24 the robot arm tip 14055 among the vehicles for synching purposes. Once coupled and locked, coupling 110 blocks lateral movements 1801 between the coupled IVs, blocks vertical movements 1802 between the coupled IVs, and blocks longitudinal movements 1803 between the coupled IVs, and because coupling 110 has an extended length that resides in both its host IV 102-AV and the recipient IV 102-AW, it resists torque in the X, Y, and Z plane, and thus resist yaw, pitch, and roll between the vehicles. The net results is a zero degrees of freedom coupling between IV 102-AV and 102-AW. When fully and rigidly coupled, the subset of at least two of the rigidly coupled IVs 102-AV, AW, which each having a front door and a back door that aligns with each other, allow the movement of at least one of passengers 112 or cargo, as shown by 2201-2203 of FIG. 22, between the subset of independent vehicles.

Figure 19:
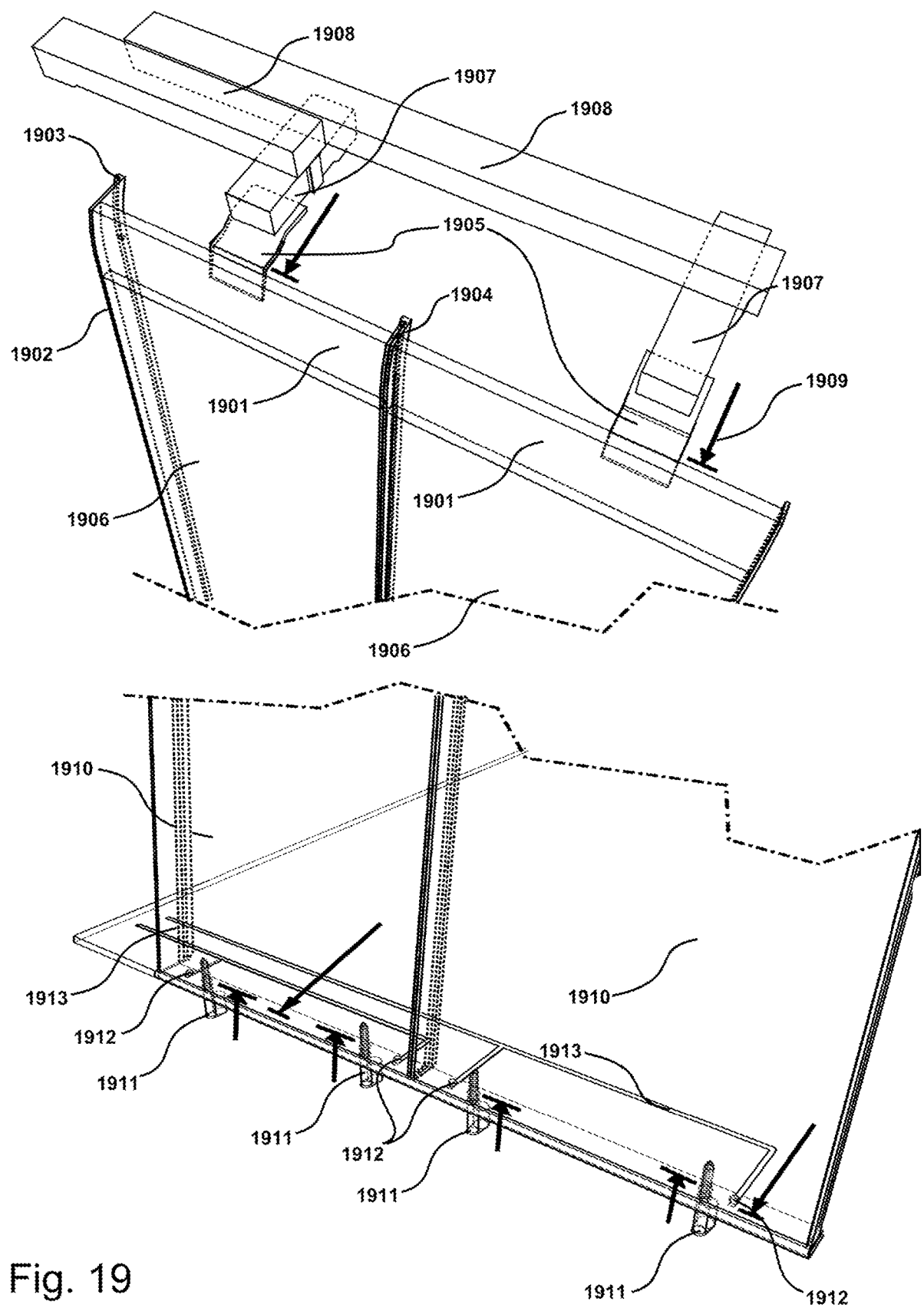
FIG. 19 illustrates sliding doors mechanisms implemented on the top, and the sliding tracks and locking pistons on the bottom on an independent vehicle, according to one or more embodiments.

FIG. 19 illustrates the sliding doors mechanism on the top and the sliding tracks and locking pistons on the bottom of an IV, according to one embodiment. 1901 represents the upper structural frame of a door panel, 1902 represents side structural door panel frame, and 1903 represents an "L" shaped border with gasket. In one embodiment, the L shaped gasket can act as a sealing system to avoid that high air pressure on the front doors to create external unwanted air leaks to the inside. 1904 represents a L shaped gasket of the structural lateral frame of the two doors that is designed to push one other when closing, compressing the gasket border that insulates the interior from air leaks. 1905 represents the upper doors holder connecting the doors to the linear actuators system 1906 represents safety glass framed in the sliding doors, and 1907 represents the longitudinal linear actuators pulling inwards the door panels before sliding sideways. Further, 1908 represents the lateral linear actuators sliding panels sideways, 1909 represents the state when doors are closed, the longitudinal actuators push and hold the panels outwards to the border (top and floor) external gasket that prevent air leaks from outside. 1910 represents reinforced bottom part of the door panels. This improves the structural resistance in case of frontal impacts. 1911 represents the door locking pistons, which are released when doors are closed to lock and hold the bottom part of the panels against the front air pressure, when attempted to force open from the outside or inside. 1912 represents metal spheres that hold by the bottom of the door panels, to facilitate sliding in the tracks 1913. 1913 represents sliding tracks for the metal spheres under the doors, as discussed above.

Figure 22:
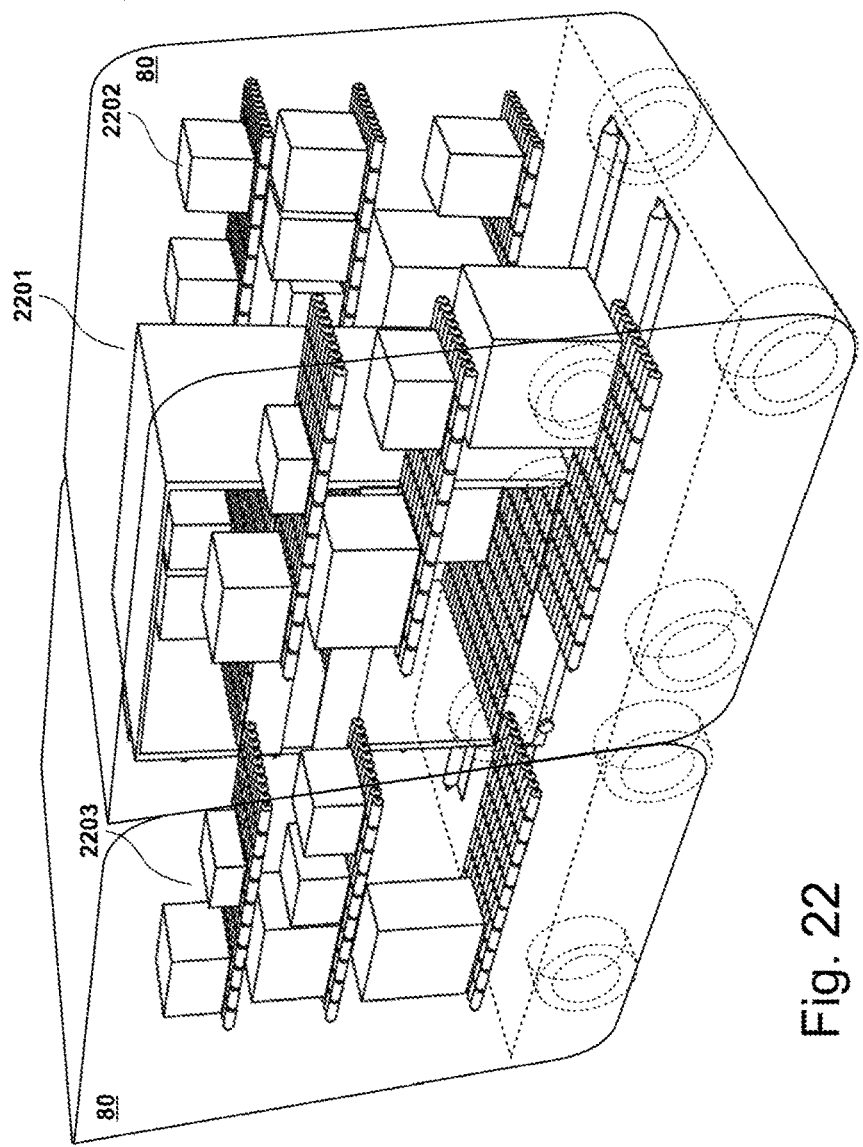
FIG. 22 illustrates a diagram of an automatic system designed for goods dispatching using an independent vehicle, according to one or more embodiments.

FIGS. 20-21 illustrates the retraction of the locking pistons retracts that results in unlocking of the doors of a self driving autonomous vehicle, according to one embodiment of the present invention. As illustrated the locking pistons retracts, unlocking the doors. 2001 represents locking pistons in a retracted state. 2002 represents the retracted doors and the bottom part spheres slide in the guides/tracks. 2003 represents a gliding sphere sliding sideways on the track 2004 represents longitudinal actuators that pull the doors inwards before sliding sideways FIG. 22 represents a robotic system designed for automatic goods dispatching using the specific vehicles in the invention. Such a system this will cut waste time in goods dispatching, by facilitating redistribution of goods in motion and without a parking place, a warehouse or optionally a human worker AN IV, in one embodiment, can be used as automated cargo vehicles with this robotic system instead of the seats for passengers. Such a robotic system is a sort of motorized shelf that can move among multiple connected vehicles pulling and pushing packages from the shelves of the vehicles themselves. Item 2201 illustrates a state when vehicles are physically joined and doors are open, the robotic shelf can move among the vehicles. Item 2202 represents a generic box of goods in its initial position. Item 2203 represents a generic box of goods in its final position after the robotic shelf has brought it to that position.

Figure 23:
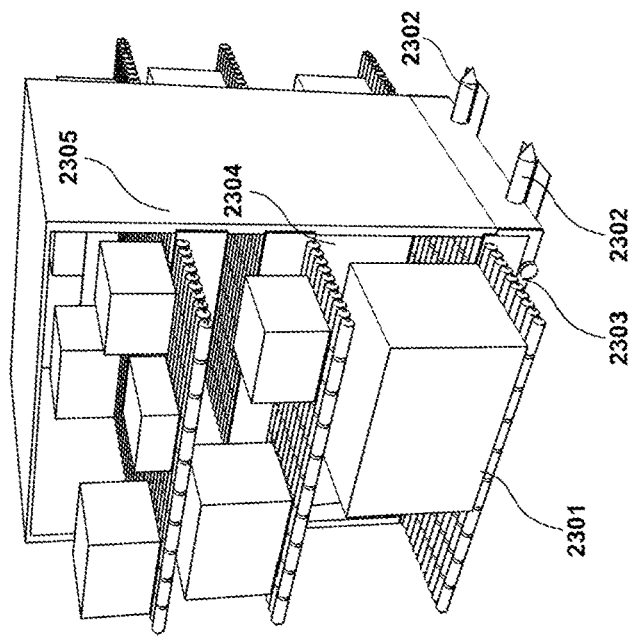
FIG. 23 illustrates motorized rollers and shelf layers that pull packages from the shelves to the central motorized robotic shelf of an independent vehicle, according to one or more embodiments.

FIG. 23 illustrates motorized rollers shelves layers that pull packages from the shelves to the central motorized robotic shelf of a self driving autonomous vehicle, according to one embodiment of the present invention. Item 2301 represents motorized rollers shelves layers that pull packages from the shelves to the central motorized robotic shelf, and in reverse that push the package in the new position on the shelf of another connected vehicle. Item 2302 represents floor tracks for the robotic shelf to stabilize the structure from lateral inertial forces. Item 2303 represents little wheels moving the robotic shelf among the joined vehicles. Item 2304 represents sliding vertical panel that avoid packages to fall from the sides of the shelves. Item 2305 represents example of a box of goods rolling from a shelf layer of the vehicle to a shelf layer of the robotic shelf.

In one embodiment, the packages dynamics can be managed by an optical recognition or similar (such as RFID) system wirelessly connected with a logistic central server giving specific orders to the robot. So multiple cameras would be placed in the vehicles and on each shelf to recognize and track the packages.

Figure 24:
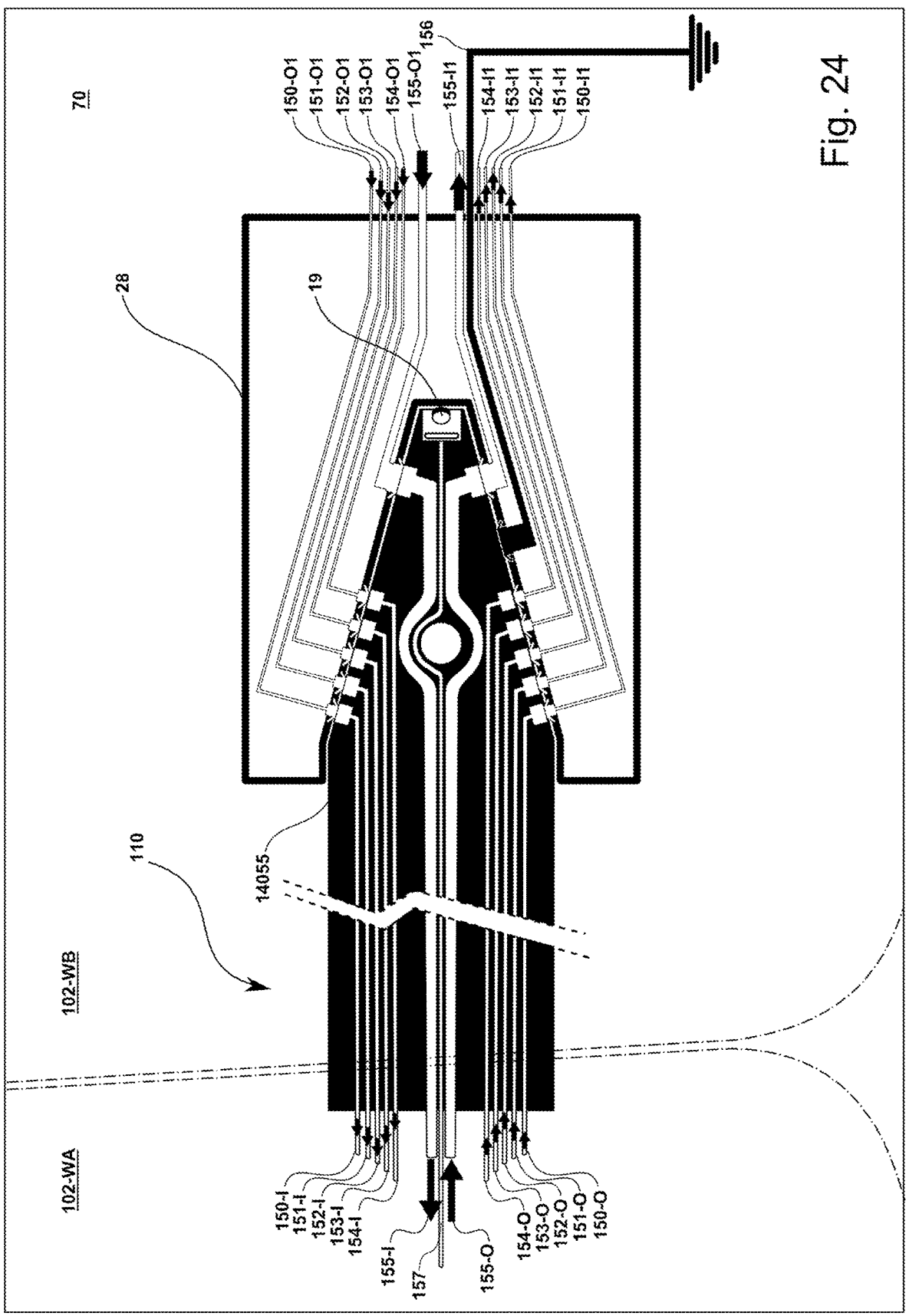
FIG. 24 illustrates a communication adapter, according to one or more embodiments.

Referring now to FIG. 24, a communication adapter is shown, according to one or more embodiments. In particular, communication adapter 70 embedded in tip 14055 of coupling 110 shown in FIG. 14 includes a plurality of signal lines 150-157 that are configured to communicate instructions between an independent vehicle and another independent vehicle, e.g., 102-B and 102-C of FIG. 1, to control at least the steering system in either the independent vehicle or the another independent vehicle, and in this specific embodiment to allow IV 102-C to control steering in the trailing IV 102-B. Alternatively, the communication adapter is configured to communicate instructions between an independent vehicle and another independent vehicle to control at least two independent vehicle systems from the group of the energy storage system, the propulsion system, the active suspension system, the braking system, and the steering system in either the independent vehicle or the another independent vehicle. And in another embodiment, the communication adapter is configured to control all the noted vehicle systems. For an RCVA 101, of FIG. 1, embodiment, the communication adapter 14055 is coupled between two rigidly coupled IVs to provide communication and control between one IV and another IV can have a shared or a master/slave relationship, as is required for multiple IVs rigidly coupled together to be able to travel, turn, brake and steer as a single unit.

In one embodiment, each of the rigidly coupled IVs, e.g., 102-B, C of FIG. 1, and as shown here in FIG. 24 as IV 102-WA and 102-WB, further comprises: a power adapter 155-I and 155-O lines built into coupling tip 14055 to transfer power between at least one independent vehicle of the plurality of independent vehicles to at least another independent vehicle of the plurality of independent vehicles in order to power the propulsion system of the at least another independent vehicle. Thus, for example, a lead vehicle could be controlling steering of a trailing vehicle, while the trailing vehicle is transferring power to an intermediate or a lead vehicle. Because there are two separate power lines 155-I and 155-O, besides ground 156, power can be transferred bidirectionally, e.g., from a trailing IV to a middle IV and from a leading IF to the middle IV. Power transfer can be DC, or can be A/C, with inverters converting DC power from energy storage (traction batteries) to AC, for safety purpose, as either a single-phase or two-phase. Braking data input 1504, steering data input 151-I, propulsion data input 1524, self-driving sensors data input 1534, vehicle ID/communication data input 154-I are transferable as inputs from coupling tip 14055 of trailing IV to receptor 28 in a forward IV. In turn, braking data output 150-O, steering data output 151-O, propulsion data output 152-O, self-driving sensors data output 153-O, vehicle ID/communication data output 154-O is provided by the forward IV receptor 28 to a trailing IV via signal lines in coupling tip 14055. Ground is the body of coupling tip 14055, and in the receiving vehicle, 156 chassis ground Signal line 157 is camera data transferred to controller, as shown in subsequent FIGS. 29 and 30. Signal connectors in IV 102-WB include braking data output 150-O1, steering data output 151-O1, propulsion data output 152-O1, self-driving sensors data output 153-O1, vehicle ID/communication data output 154-O1, raking data input 150-I1, steering data input 151-I1, propulsion data input 152-I1, self-driving sensors data input 153-I1, and vehicle ID/communication data input 154-I1.

Referring now to FIGS. 25-A and -B, a selectively removable pod is shown, according to one or more embodiments. Specifically, removable pod 119 as disposed on the chassis to control for one or more of a steering control 68, a braking control 96, and a propulsion control 48. The instrument pod 119 allows direct manual input, or controller-assisted manual input, to noted controls as well as the active suspension system. The steering system is infinitely variable for controlling the angle of the wheels which have a wear surface 8-A comprised of rubber, and which at least one set of the wheels, in one embodiment, is selectively retractable as shown in subsequent FIG. 26. Active suspension 11 is coupled to the chassis 5 and to the local controller, 2095 of FIG. 29, and is capable of adjusting a height 13-A to 13-D of the independent vehicle, e.g., to match another object, such as an independent vehicle coupled thereto, or targeted for coupling.

Referring now to FIG. 26-A, a rigidly coupled assembly of individual vehicles having retractable wheels is shown, according to one embodiment of the present disclosure. Specifically, RCVA 101-B includes four IVs 102-E, F, G, and H with each IV having varying states of engagement with the road. IV 102-H, as the lead vehicle, has back wheels engaged ("E") with the road while its front wheels are retracted ("R"). Middle IVs 102-F and G, have all wheels retracted. Tail IV 102-E has only its front wheels engaged with the road, while its back wheels are retracted. If at least engaged wheels also have power train capability, e.g., hub motors, then the RCVA 101-B has power for locomotion. And if at least the engaged wheels also have steering capability, then the RCVA 101-B has turning capability. Solenoid 2603 is coupled to chassis 5, with actuator 144, and power supply 2604 providing the means for retraction. Other means, such as hydraulic, mechanical linkage, and pneumatic forms of motion and retraction, are also envisioned as embodiments to provide the retraction or engagement state of the wheels. By retracting wheels, rolling resistance of the RCVA 101-B is greatly reduced, and wear on tires from turning is also reduced. The connection of coupling 110 from IV to IV forms a backbone along the entire RCVA 101-B to provide rigidity. Thus, RCVA 101-B now has the appearance of a city bus with steering at the front, and power provided at the back, and with a long wheelbase, that is longer than a separate IV, to provide a more comfortable ride. Thus, the present disclosure provides a vehicle that has a selectively variable wheelbase, depending on load, quantity of IVs coupled together, type of ride desired, road condition, load rating of road, etc. In the present embodiment, every IV in the RCVA has selectively retractable wheels. In another embodiment. In yet another embodiment, only the back at least one of the IVs in the RCVA (system) has at least one selectively retractable wheel when the at least one independent vehicle is rigidly coupled to at least one other independent vehicle in the system.

Referring now to FIG. 26-B, a rigidly coupled assembly of individual vehicles having retractable wheels is shown, according to one embodiment of the present disclosure. Specifically, RCVA 101-C includes four IVs 102-J, K, L, and M with each IV having varying states of engagement with the road. Unlike RCVA 101-B, the load in the present RCVA 101-C is concentrated in the middle region 2605. To reduce strain on coupling and mated coupling in middle IV 102-K and L, additional wheels are extended to contact the road surface and spread the load, with both sets of wheels extended for IV 102-K, and only the back set of wheels extended for 102-L.

Figure 27:
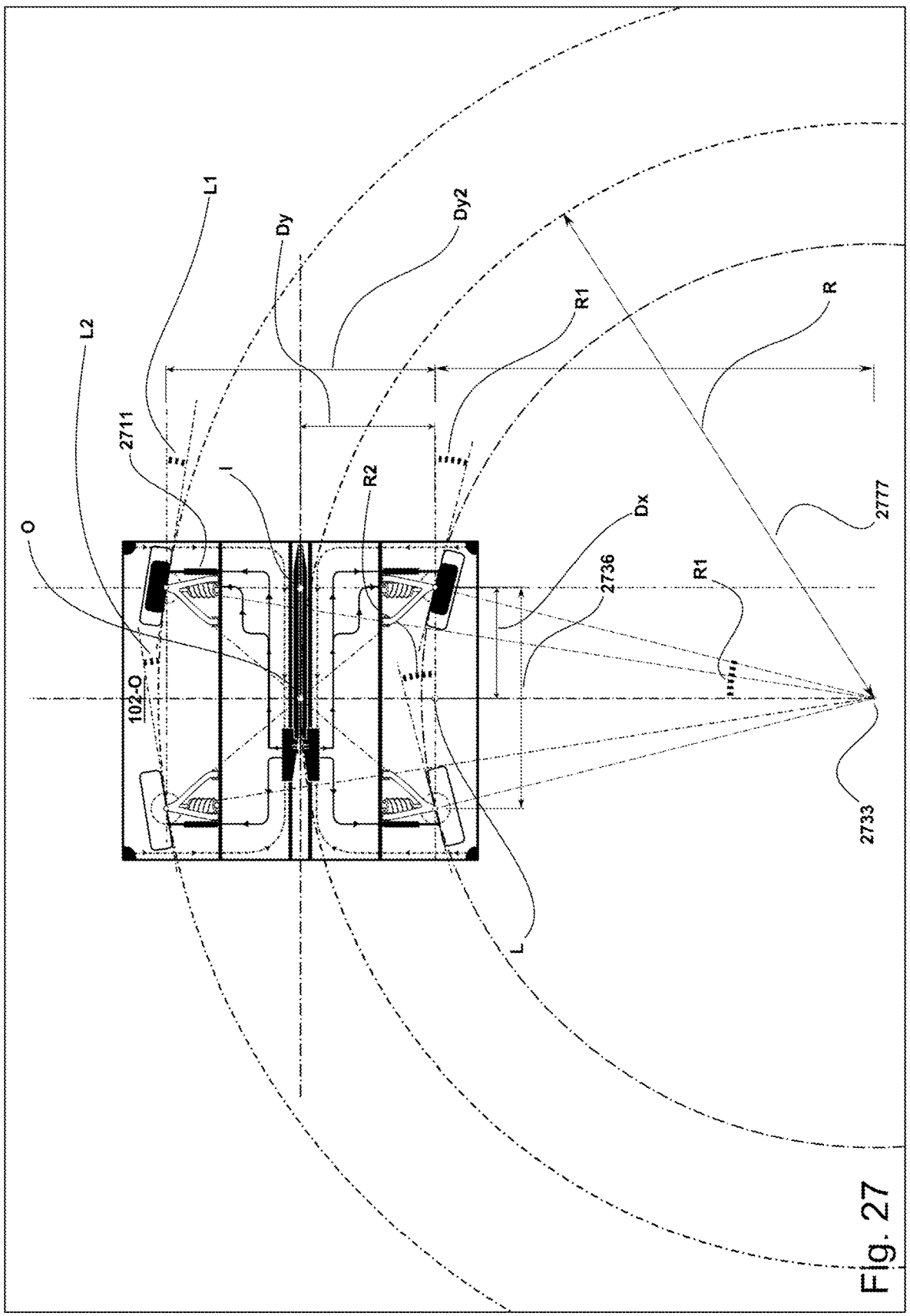
FIG. 27 illustrates a top section view of the wheels and the steering system for a separate IV module, according to one or more embodiments.

Referring now to FIG. 27, a top section view of the wheels and the steering system is shown for a separate IV module, according to one or more embodiments. Coupling arm/plug 2711, actuates each of the four independent steering wheels independently at its specified angle, e.g., per the front and back sensors, per manual steering wheel input, or per automous driving algorithm instructions. The IV 102-0 is performing a turn for a curve with a certain radius 2777 (intended here as the distance from the center "0" of the vehicle to the curve center 2733). The left wheel's linear distance from center point 2733 is R+Dy2, and right wheels are located a distance R+ from center point 2733. Each individual wheels' steering angle is calculated from the steering managing system, which is the controller 2905 of FIG. 29, plus the steering input, and a determination of how many IV modules are rigidly coupled (the latter not applicable for a single IV). The formula to calculate the steering angle is straightforward for this one vehicle unit situation and is given by the following expression for R1, R2, L1 and L2. As shown in subsequent FIG. 28, the algorithm used by the steering managing system of the head/lead vehicle is more specific, and distinguish the present disclosure of modular road vehicles capable of coupling and steering/turning together even without the need for articulation among them. The expression for the single IV steering is as follows, with defined terms listed thereafter:

$$R1=-R2=\arctan(Dx/(R-Dy))$$

$$L1=-L2=\arctan(Dx/(R+Dy))$$

R: curve radius (distance between curve center 2733 to vehicle horizontal plane geometrical center "O" represented by the center of the quadrilateral shape having as vertices the centers of the vertical rotational/steering axis of the wheels.

Dx: distance between point "O" and the center "I" 2730 of the front wheels (virtual) axis line Dy2 (equal to the distance from the back axis given the definition of the point "O").

Dy: distance between point "O" and the center point "L" of the line 2736 having as vertices front right wheel steering center, and back right wheel steering center (equal to the center between left wheels, given the definition of "O").

Figure 28:
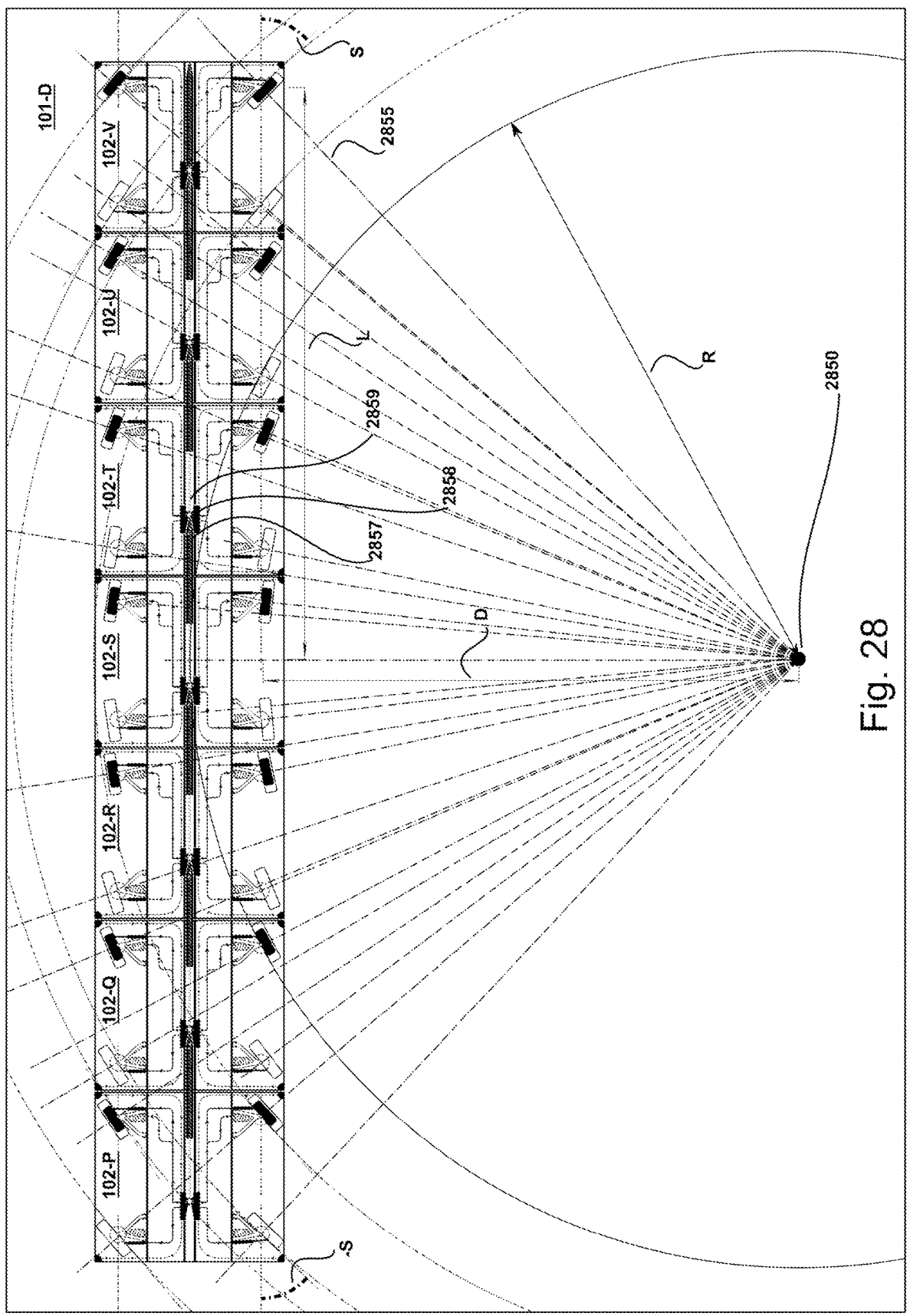
FIG. 28 illustrates a turning of multiple individual vehicles coupled together as a single rigidly coupled vehicle assembly, according to one or more embodiments.

L1: steering angle of front left wheel
R1: steering angle of front right wheel
L2: steering angle of back left wheel
R2: steering angle of back right wheel Referring now to FIG. 28, an illustration of turning multiple IVs coupled together as a single RCVA is shown, according to one or more embodiments. Specifically, seven IV units 102-P, Q, R, S, T, U, and V are rigidly coupled together in a single RCVA 101-D via arm/plug, aka coupling, 2857, in the receiver of the related front unit 2858 that extends sequentially through the entire RCVA 101-D, similar to a selectively flexible or rigid (shown as rigid here) vertebral backbone architecture. The RCVA 101-D turns on curve of radius R intersecting the middle of the length of RCVA 101-D with the goal of turning the RCVA 101-D as a single unit.

In this case, front unit 102-V, on the right side, is the leader vehicle, calculating the steering amount for every wheel of the RCVA 101-D "train" and sending the data to all the other units 102-P, Q, R, S, T, and U via wired connection 2859, while using the high level steering input (curve radius) given by the driver in the lead vehicle 102-V and/or front sensors of the lead vehicle 102-V plus rear sensors of the tail vehicle 102-P. The expression for the RCVA steering is as follows, with defined terms listed thereafter:

$$S=\arctan(L/D)$$

S 2854: steering angle for each wheel
D 2852: minimum distance from the curve center to the longitudinal wheel axis
L 2853: minimum distance of the wheel transversal axis from the center of the curve (negative if axis located before the center of the curve, in the motion direction)

As shown, the plurality of wheels of the rigidly coupled independent vehicle assembly that are in contact with a driving surface, i.e., that are not retracted, are linked together (steer by wire in the present embodiment) such that an axle, e.g., 2855 of each of the wheels simultaneously points to a common center point, or loci, 2850 of a turning circle when the rigidly coupled independent vehicles are turning as a single unit. Thus, the angle of each wheel depends on its linear distance from line D. For example, wheels in center IV 102-S have an angle which is closer to zero degrees (pointing to the front of the RCVA 101-D), while wheels at the trailing unit 102-P are closer to −45 degrees "−S", and while wheels at the leading unit 102-V are closer to +45 degrees "S". The actual position, i.e., steering angle, of each wheel is unique, because each wheel is disposed at a different radius from the common center point and at a different longitudinal position along the length of RCVA 101-D. Consequently, the use of controller 2905 is helpful in making these adjustments, and for considering which wheels are retracted or extended.

Referring now to FIG. 29, an illustration is shown of a steering input for a single IV 102-W according to one or more embodiments. Steering input comes from self driving-sensors on front side 2902 and back side 2903 or human driver 2901 (or a combination thereof), and is stored in data storage 2904, e.g., solid state or hard drive memory, and processed to the central processing unit, aka controller, 2905, then sent to the wheel managing unit 2906 to dynamically adjust the power to each motor, e.g., hub motor 10-A and 10-B as shown in FIG. 13, for each powered wheel (all wheels powered for an AWD configuration) and for the steering angle of each wheel 2907 (for all wheels that have steering capability). Note that wheels 2907 are positioned further apart on actual IV than that shown in drawing for illustrative purposes.

Male plugs, aka connector, 2912 and female plugs, aka receptor, 2908 are disposed on the front and back of IV 102-W so as to interface with other vehicle modules that might couple to the front or back of IV 102-W. The communication adapter plug will exchange electrical (or mechanical) data with IVs to which IV 102-W may couple. A more detailed example of the signal lines in communication adapter 70 is shown in FIG. 24. In particular, steering input from the vehicle sensors 2902, 2093 is transmitted to coupling 2915 at the front of IV 102-W and motor power and wheels steering angle data 2909 to an IV that may couple to the back of IV 102-W.

The system receives the same data inverted on signal line 2910 from an IV that might coupled to the back of IV 102-W and to a signal line 2913 IV for which front of IV 102-W might couple, the latter which might bypass IV 102-W's own generated data 2911 and 2914. Camera 19 and display transmitter 29 can communicate alignment and travel logistics information to IVs to which might couple with IV 102-W.

Battery management control 76 and thermal management control 74 interfaces with controller 2095, for proper charge and discharge of battery resources. Wireless transceiver 78 is coupled to the remote server fleet management system 79 and to internal central processing unit 2905 for exchanging data and instructions.

Local controller 2095 controls at least one of an independent vehicle system, as shown in FIG. 13 or 29, including the energy storage system 17, the propulsion system 10-A, B, the active suspension 11, the braking system 90, and the steering system 60 when configured to be selectively slaved to a receiver 19 or to the communication adapter 70, as shown in FIG. 24, or to a remote wireless server 79 to control at least one of the independent vehicle systems. Coupling 110, shown in FIG. 24, includes a power adapter 155-I and O, to transfer power between the IV 102-W and another independent vehicle to power the propulsion system 10 or to replenish the energy storage system 17. Slaving means a local controller is overridden in one or more designated vehicle systems, by a control signal provided by a source other than the local controller. Safety functions and manual interrupt of the slaved local controller exists for failsafe purposes.

Referring now to FIG. 30, a communication and control system within an RCVA 101-E is shown, according to one or more embodiments. The RCVA 101-E includes three coupled IVs 102-X, Y, and Z, in the present embodiment. Front IV 102-Z is the lead IV, so its human driver 3021, and/or self-driving apparatus 3022, is the source that manages the balance of the vehicle systems in IVs 102-X and Y, i.e., coupled on the back of IV 102-Z.

In particular, front driver 3021 and/or front sensors 3022 combine the tail sensors inputs 3028 coming from the tail vehicle 102-X via signal line 3027 through IV 102-Z's coupling system plug 3024. These input are received in memory 3023 and processed by the head vehicle IV 102-Z, then distributed to all the following connected vehicles 102-X and Y, using also in this case the bypasses 3025 will bypass coupling connection system IV 102-X's and Y's own generated driving/steering data. For example, middle IV 102-Y input from sensors 3026 and driver are ignored or are inactive. Thus, each IV 102-X, Y, and Z, as described in FIG. 29, includes a local controller 2905, a receiver 19 and/or communication adapter 70 for receiving a master signal to slave at least one system in one IV to a controller in another IV. Control and sensor input can travel bidirectionally through RCVA 101-E in different scenarios. For example, sensor information can travel in one direction (from IV 102-X to 102-Z) and steering control can pass in the opposite direction (from IV 102-Z to 102-X). In a scenario when RCVA 101-B backs up, then IV 102-X becomes the lead vehicle and the roles and slaving is reversed, with IV 102-X providing the steering control information to override and control the other IVs 102-Y and Z.

Figure 31:
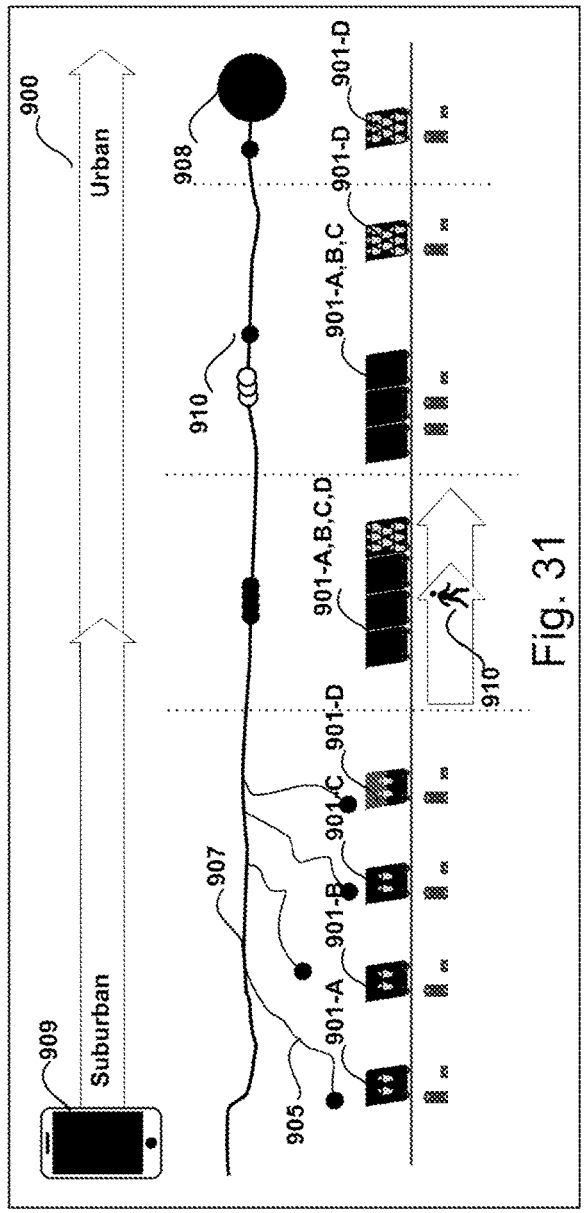
FIG. 31 is an optimized transportation scenario for a typical commuter morning route from the suburbs to an urban center, according to one or more embodiments.

Referring now to FIG. 31, an optimization transportation scenario 900 for a typical commuter morning route from the suburbs to an urban center, according to one or more embodiments. Multiple IVs units 901-A to D request, e.g., via mobile application 909, transportation resources passengers on local suburban roads, e.g., side streets or roads 905-A. When the IVs reach a main trunk road 907 shared heading the destination, they couple in the single rigid assembly of IVs 901-A to D in order to consolidate passengers 910 in a fewer number of IVs. When condensing of passengers is complete, the empty IVs 901-A, B, and C detach from the assembly at point 910 to (optionally autonomously) park, charge, and continue to another route. The remaining IV 901-D proceeds to destination 908, e.g., an urban center, with a full load of passengers. The result of this procedure is a considerably higher occupancy rate leading to a reduced traffic footprint and an overall optimized energy consumption per passenger. Specifically, reduced aerodynamic drag arises by having multiple IVs coupled together, thereby improving efficiency of at least one coupled IV compared to that IV driving separately and having to overcome its full vehicle aerodynamic drag. Multiplying this by all the IVs coupled in an RCVA, and substantial energy savings and reduced energy consumption arise. Other benefits of coupling IVs for at least a portion of a route of a first IV and a second IV is: consolidating passengers or cargo into fewer quantity of individual vehicles, providing a substitute for an individual vehicle with a malfunction, assembling individual vehicles into a single rigid unit, increasing efficiency of operation of an assembly of vehicles, and reducing energy consumption of at least one of the individual vehicles, increase open space by sharing space of both the first and second vehicles, and provide an entertainment or service-focused independent vehicle.

Figure 32:
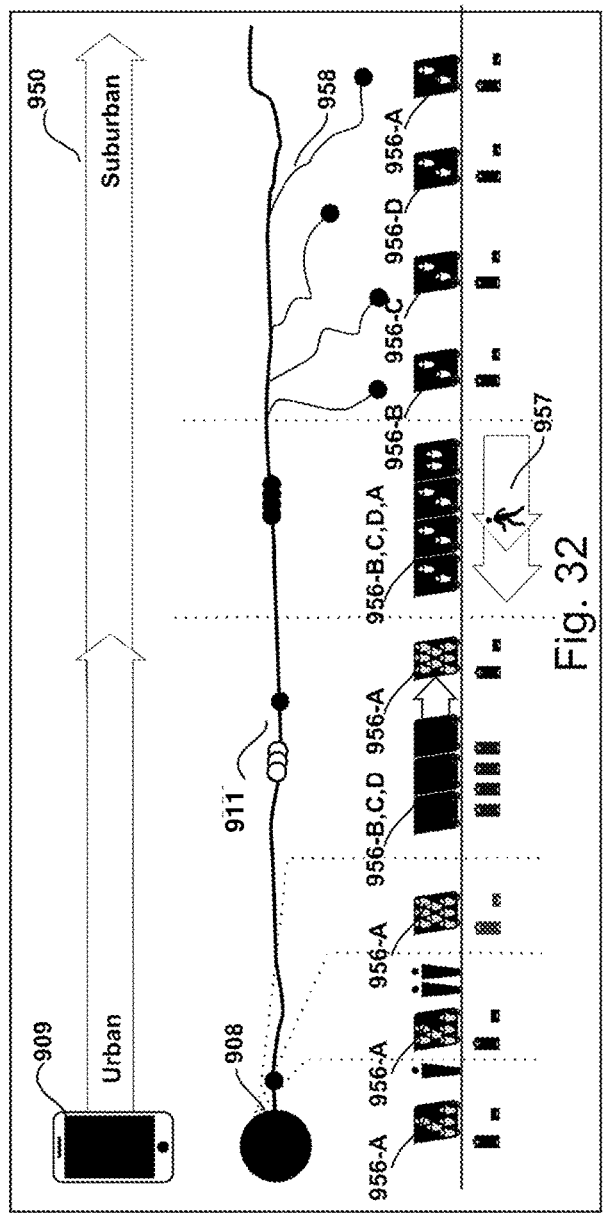
FIG. 32 is an optimized transportation scenario for a typical commuter afternoon route from an urban center to the suburbs, according to one or more embodiments.

Referring now to FIG. 32, an optimized transportation scenario 950 is shown for a typical commuter afternoon route from an urban center to the suburbs, according to one or more embodiments. An IV 956-A picks up multiple passengers within a small urban area 908 at typical concentrated pick up points, allowing multiple sequential embarking stations. Passengers travel in dense, high occupancy IV 956-A to point 911 on a trunk route where support IVs 956-B, C, and D join and rigidly couple with the ongoing IV 956-A prior to divergence of routes. Passengers redistribute 957 to appropriate IVs, e.g., 956-B, C, D, and A based on their destination, following internal visual/audio signaling or mobile app notifications 909. IVs 956-A to D subsequently decouple to follow different routes for single passenger destinations on suburban side roads 958. This logistic method optimizes traffic and consumption in urban areas while optimizing ubiquity and comfort on the suburban areas, guaranteeing local pick up and drop off.

Referring now to FIG. 33, alternative door layouts in IV 102-AB are shown, according to one or more embodiments. Door layouts comprise both front and rear and also lateral doors for embarking/disembarking via retractable stairs 3302. In version (AA) all the 4 doors are closed, while in version (BB) all the sliding doors open on all the sides, and in version (CC) people can embark and disembark simultaneously from the four lateral sides. This system could further allow central symmetry of the IVs such as having a perfect square base and body, matching other similarly shaped compatible IVs.

Referring now to FIG. 34, alternative IV shapes and interconnecting adapters are shown, according to one or more embodiments. Specifically, mating shapes adapter 3402 allowing the rigid or articulated coupling of differently shaped IVs 102-AC and 102-AD that rigidly couple together. This mating shape adapter is rigid, extensible or inflatable, in different embodiments, and can be an add-on or embedded feature on one vehicle or both in different embodiments. Stage (AA) represents a retracted adapter 3402-A, while stage (BB) illustrates an engaging adapter 3402-B, and finally stage (CC) shows fully rigid connected IVs with fully deployed adapter 3402-C, thereby allowing for example safe passage 3403 of people and cargo between the two rigidly coupled IVs.

Referring now to FIG. 35, a top view showing the orientation of wheels on an RCVA 101-C, while performing a synchronized laterally linear steering maneuver, according to one or more embodiments. The RCVA 101-C is comprised of three IVs 102-AE, AF, and AG rigidly coupled, which have improve lane change stability in the present embodiments. Every steerable wheel 3502 engaged with the road surface has the same steering angle, pointing in the side movement direction 3500. This maneuver is especially helpful when parking the RCVA 101-C as a single unit.

Referring now to FIG. 36, a top view showing the orientation of wheels on an RCVA 101-D, while performing a synchronized center point turnaround maneuver according to one or more embodiments. The RCVA 101-D comprises three IVs 102-N, O, P rigidly coupled together. The axles of all steerable wheels engaged with the road surface point to the same turning radius center point 3600 located within the base area of RCVA 101-D. As it is in this example center 3600 is the geometrical center of the RCVA to show the flexible maneuvering of an RCVA in zero space to make a conventional U-turn or Y-turn. In this very case the wheels steering are symmetrically angled 3601, 3602, and 3603. Specifically, all wheels within a given IV have a same angle, with opposite phase. That is, wheels in IV 102-AJ have an approximate 30 degree angle from an in-line orientation for forward motion, but with diagonal wheels having the same phase, +30, and with the other wheels having a −30 turning angle. Conversely, wheels in outer IVs 102-AH are essentially parallel to each other, but with different phase from the top wheels, +80 to bottom wheels −80 from the in-line forward orientation. For wheels that cannot accommodate the higher steering angles, but that have a retractable linkage, those wheels can be retracted, allowing the wheels on IVs located at the center, or closer to the center 3600 of the turn to accommodate the low-speed turnaround of the RCVA 101-D. Steering behavior in FIGS. 35 and 36 are limit steering methods usable also together to match any road cornering layout.

Referring now to FIG. 37, a driving scenario is shown where individual IVs from different RCVAs exchange positions and interleave with each other according to different destination routes, according to one or more embodiments. That is, IVs arranged in multiple RCVAs can redistribute to accommodate condensing passengers for different destination routes. In this scenario, one RCVA with rigidly coupled IVs A, B and C traveling in lane L1 rendezvous with a second RCVA with rigidly coupled IVs D, E, and F traveling in lane L2. At stage (AA), the two RCVAs are driving parallelly in the same direction on the same trunk route. However, in stage (BB), a portion of the IVs B, D, and F in each of the RCVAs plan to exit off the main trunk roadway. That is, IVs B and E would like to exchange positions with each other so as to rigidly couple with an RCVA that is different than their current RCVA. Thus, in stage (CC), "intermingling" allows IVs to re-group in motion, based on the collective shared route. In stage (CC), RCVA DEF breaks into individual IVs of D, E, and F, thereby allowing IV E to change lanes. Similarly, RCVA ABC breaks into individual IVs of A, B, and C, thereby allowing IV B to change lanes. After changing lanes, aligning and coupling with a desired sequence of IVs based on destination, the operation is complete. In stage (DD), the RCVA of AEC continues straight down the trunk route, while RCVA of DBF exits per their route. The entire operation of interleaving and rearranging IVs among different RCVAs occurs while the vehicles are in motion, thus reducing time for stopping, finding parking, and rearranging passengers. This process can continue as destination routes become more and more fragmented, and as RCVAs arrive on the trunk from different sources going to different destinations.

Figure 38:
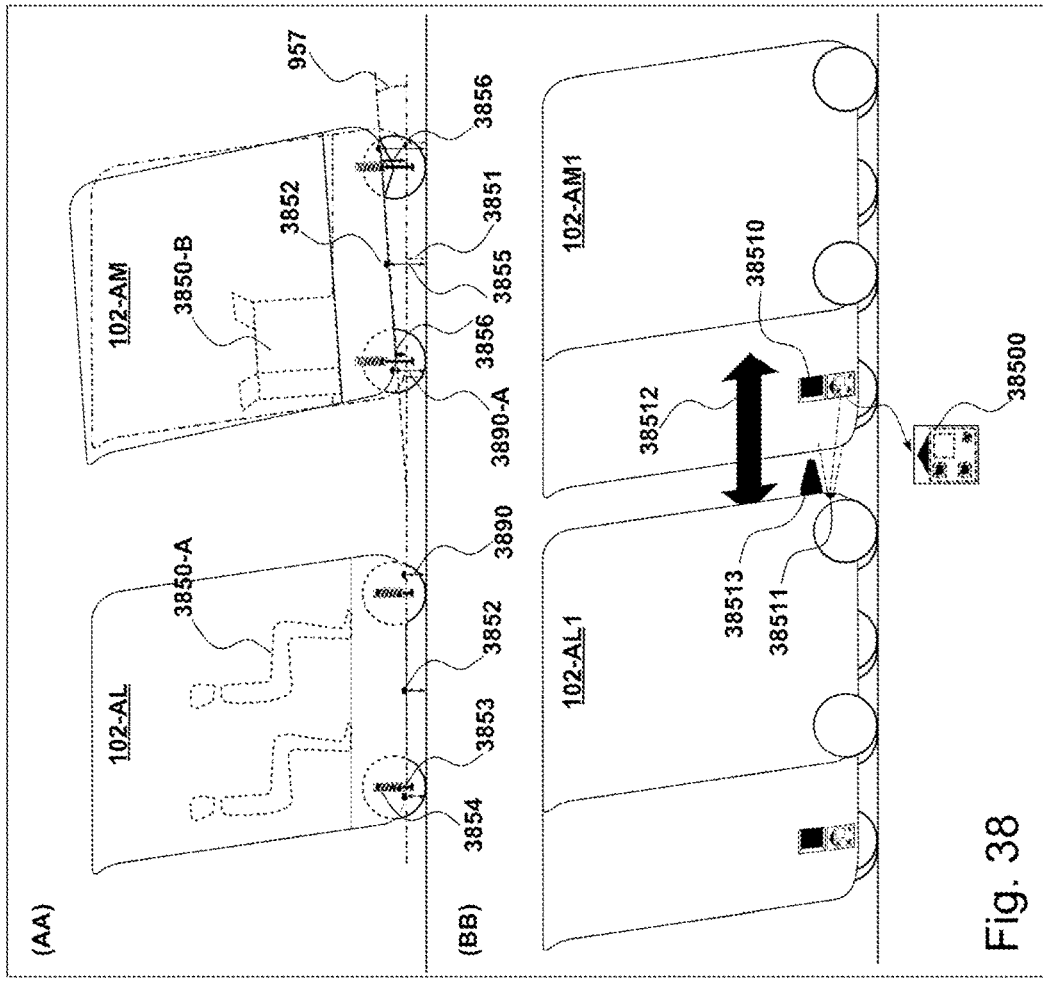
FIG. 38 is an illustration of the active suspension system aligning multiple individual vehicles, according to one or more embodiments.

Referring now to FIG. 38, an illustration of the active suspension system aligning multiple IVs is shown, according to one or more embodiments. Steering actuators and motors to cancel major misalignment between coupling vehicles. In stage (AA), two IVs 102-AL and 102-AM with different internal load 3850-A vs 3850-B, results in a major height and inclination, aka pitch, difference from the ground 3856. The proximity sensors and tilt sensors 3852 on the base of the vehicles reveal the vehicle ground distance 3855 and inclination 957. The actuators 3853 embedded in the suspensions system 3854 align IV 102-AL to the same default ground distance and zero (parallel to ground) inclination 3851. In stage (BB), a bottom of IV 102-AL1 is following and aligning laterally 38512 to the lead IV 102-AM1 using optical sensors 38511 that track the tag image 38500 present on the back of the vehicle followed. Aligning the two IVs 10-AL1 and 102-AM1 places coupling arm 38513 on the same horizontal co-linear axis as the back receiver 38510 of IV 102-AM1, to facilitate coupling.

Figure 39:
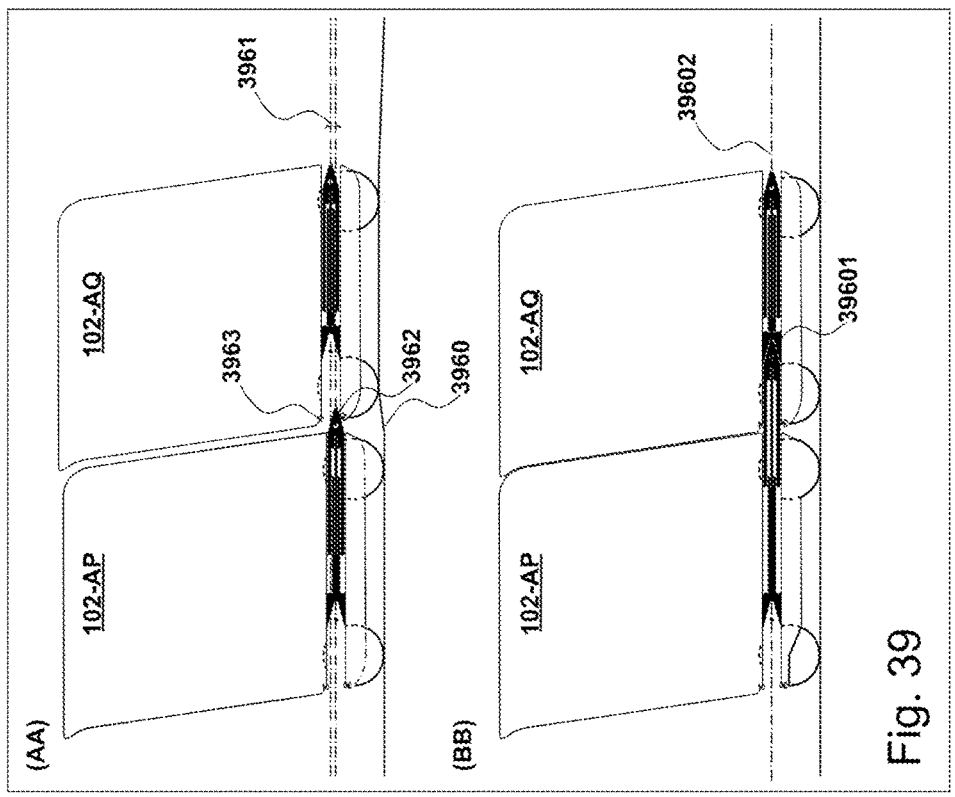
FIG. 39 is a passive alignment system for dynamically engaging a coupling and a receiver, according to one or more embodiments.

Referring now to FIG. 39, a passive alignment system is shown for dynamically engaging a coupling and a receiver, according to one or more embodiments. In the present embodiment, cushioned roll bearing 3963 on the entry area of receiver 3965 and tapered, self-centering, but rigid coupling arm 3962 together allow for flexible engagements of the coupling 3962 into the mated coupled receiver enters the receiver of slight misalignments 3961 between mating IVs, for example due to minor road unevenness 3960, and mismatched driving alignment. Once the coupling arm is locked 39601 inside the vehicle ahead, the vehicles are rigidly joined and the vehicles are completely coaxial 39602.

Referring now to FIGS. 40-A and 40-B, a top view and a side view illustration of a mixed orientation of wheels is shown for an RCVA 101-E, while performing a turn, according to one or more embodiments. The RCVA 101-E comprises three IVs 102-AR, AS, and AT that are rigidly coupled together with a combination of retracted and non retracted wheels. The axles of all the wheels in contact with the road pavement point to a common center point 4000 of a turn radius, but the rear wheels 4001 of the last IV 102-AR in the RCVA 101-E remain straight with axles pointing, i.e., aligned, with turning center point. In particular, front wheels 4002 of first IV 101-AT are turned for the turn of RCVA 101-E, but the rear set of wheels 4004 in 102-AT are retracted, having no influence on the turn. Similarly, the front wheels 4002 of $2^{nd}$ IV 102-AS are turned for the turn, but the rear set of wheels 4004 of IV 102-As are retracted and have no influence on the turn. Finally, the front set of wheels 4002 for the last IV 102-AR are turned the least, and the rear wheels 4003 of IV 102-AR are not retracted, but remain engaged with the road, yet remain straight. As the turn is only initiated, the rear axles of rear wheels 4003 of IV 102-AR point to the center point 4000. This is a unique turn in that it will result in the lead IV 102-AT extending out further from center point 4000, compared to a turn that is initiated by turning all wheels engaged with the road. In some scenarios, the present hybrid mix of steering only a portion of the wheels engaging the road surface has a benefit of maneuver the RCVA 101-E, and shows the flexibility of controlling all the wheel sets independently, and the wide range of combinations of steering and turning capabilities.

Figure 41:
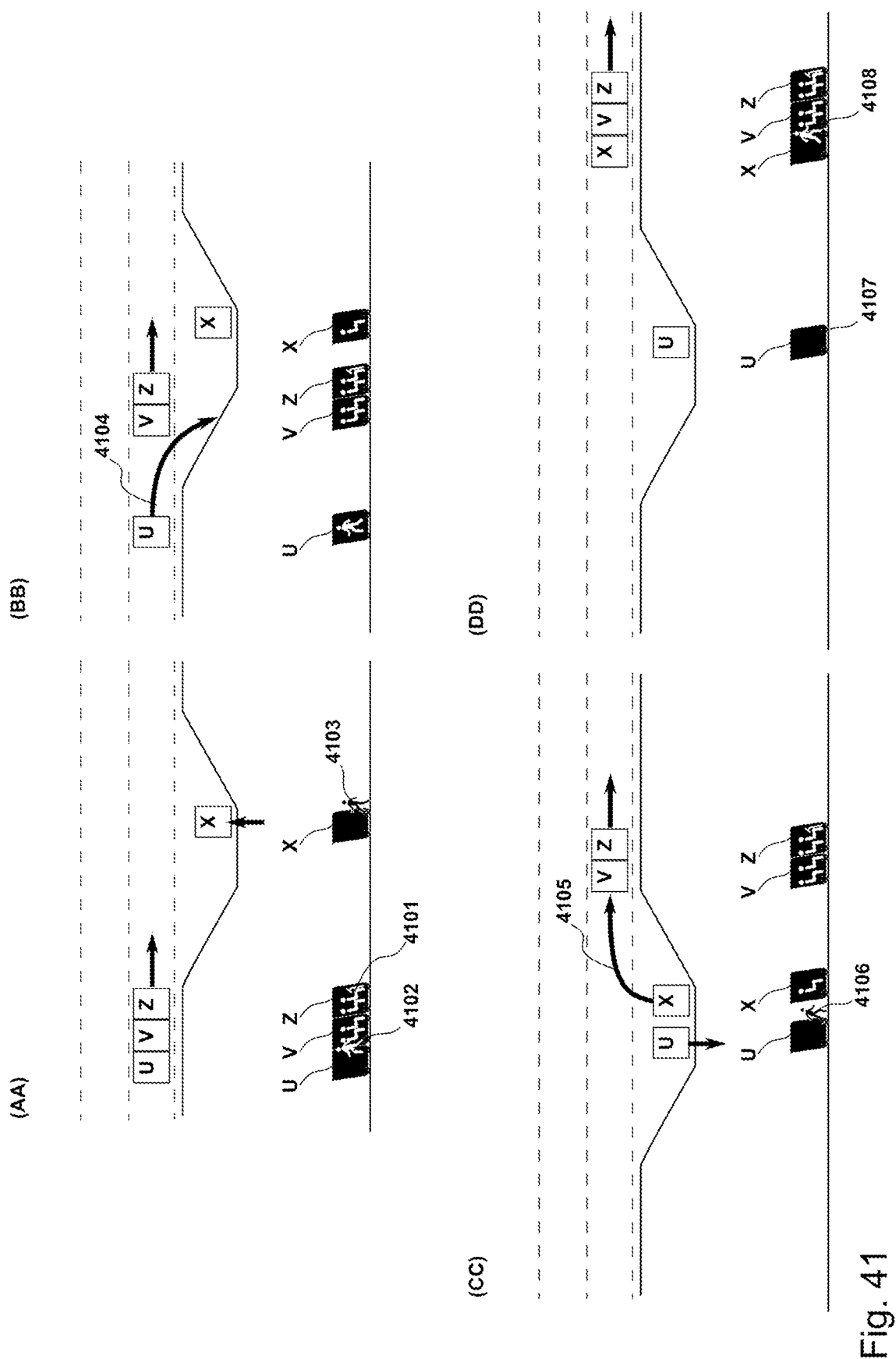
FIG. 41 is a "stop-less station" layout according to one or more embodiments.

Referring now to FIG. 41, a "stop-less station" layout is shown according to one or more embodiments. The logistical method of pickup and delivery of passengers at stations without stopping an RCVA UVZ comprised of IVs U, V and Z is particularly useful when the RCVA is human driven because of safety regulatory boundaries. This procedure allows just one human driver 4101 of multiple rigidly coupled IVs, when each IV has at least a limited or partial self-driving capability, without requiring a complete level 4 self-driving technology. In this scenario, IVs with said capability can detach from, and/or couple with, the RCVA without stopping the RCVA. In phase (AA) of this scenario, the RCVA of IVs U, V, and Z approaches a pickup station. One passenger wishing to disembark at the station moves to the tail IV U to be dropped off. In phase (BB), IV U 4104 detaches from the RCVA, turns into the station, slows, and then finally stops at the station for disembarkment of the passenger. Meanwhile truncated RCVA VZ proceeds without stopping or slowing. Near the same time, a passenger wishing to embark enters IV X 4103, which was parked at the station from a prior disembarking passenger, and in phase (CC) IV X 4105 departs from the station and accelerates to join RCVA VZ, finally coupling with RCVA VZ in phase (DD). Once rigidly coupled to RCVA XVZ, and inter-vehicle doors are open, the joining passenger 4108 can move within any IVs V or Z to take a seat, and when approaching a diverse route for his destination, then passenger 4108 can move to a tail IV for detachment and departure on his specified diverse route. Additional steps include passenger moving 4102 to the tail vehicle in order to disembark at the approaching station, then passenger disembarking 4106 at the station; and finally, parked module moves to the side 4107 to embark and to give space to the next arriving IV.

Alternatives

While the present disclosure is focused on terrestrial vehicle applications, concepts herein are applicable to other forms of transportation using other types of vehicles in other mediums that are non-terrestrial. In one embodiment, the mechanical apparatus includes a robotic arm that can couple and/or decouple with another self driving autonomous vehicle. A self driving autonomous vehicle is equipped with a sliding front and/or back door. In one embodiment, when two vehicles are coupled with each other, the front and/or back sliding doors can open to derive a single self driving autonomous vehicle. The open doors allow the free movement of passengers and/or goods move among the vehicles. This also provides the flexibility of having passengers/goods move from one vehicle to another, access to service vehicles, or to optimally dispatch/transfer people and goods (in-motion, without any stops) among various destinations. The connected vehicles can decouple at a programmable time/location and proceed on their specific and different routes.

Although the invention described herein is disclosed with self-driving autonomous vehicles (automatic vehicles), it should be noted that the vehicles described herein can also be used when the vehicles are driven by a person (manual vehicles) or a combination thereof, while possessing the above described automatic in-motion coupling/decoupling system.

The invention described herein discloses a self driving autonomous vehicle that can transport passengers and goods as well as providing an optimized logistical solution in terms of transportation service, time of travel, services and comfort for the passengers, travel price, traffic footprint optimization and carbon footprint. The invention comprises self driven autonomous vehicles capable of automatically coupling and/or decoupling to each other via a suitable mechanical apparatus, even while in motion on the road. In one embodiment, a self driving autonomous vehicle is described that includes a compartment that is configured to carry passengers or goods. Further, an IV can include a robotic arm that can couple another IV, the robotic arm providing up to support six degrees of freedom, and once two IVs are coupled using the robotic arm, both IVs operate as a single IV unit and the resulting IV unit is configured to allow passengers or goods move freely within those coupled IV units. In another embodiment, the IV is battery operated. In one embodiment, the IV can be gasoline or diesel operated. In yet another embodiment, the IV can be operated using any source of energy or combustible material.

Features which are described in the context of separate embodiments may also be provided in combination in a single embodiment. Conversely, various features which are, for brevity, described in the context of a single embodiment, may also be provided separately or in any suitable sub combination. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Structures described herein are to be understood also to refer to functional equivalents of such structures. The present invention will now be described in detail with reference to embodiments thereof as illustrated in the accompanying drawings. From reading the present disclosure, other variations and modifications will be apparent to persons skilled in the art. Such variations and modifications may involve equivalent and other features which are already known in the art, and which may be used instead of or in addition to features already described herein. Although Claims may have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those skilled in the art will readily recognize, in light of and in accordance with the teachings of the present invention, that any of the foregoing steps may be suitably replaced; reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. It is to be further understood that the present invention is not limited to the particular methodology in the art. Similarly, for another example, a reference to "a step" or "a means" is a reference to one or more steps or means and may include sub steps and subservient means.

All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing the invention described herein will be apparent to those skilled in the art. Various aspects of the invention have been described above by way of illustration, and the specific embodiments disclosed are not intended to limit the invention to the particular forms disclosed.

The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Thus, apparatuses, devices and/or vehicles, having features are described to implement a self driving autonomous vehicle. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

We claim:

1. An independent vehicle comprising:
    a chassis having a plurality of wheels, and having a first end and a second end;
    at least one vehicle system of an energy storage system, a propulsion system, a braking system, an active suspension system, and a steering system;
    a coupling disposed in the first end or the second end of the chassis;
    a mated coupling disposed in an end of the chassis opposite of that for the coupling; and
    a local controller for controlling at least one of the vehicle systems; and wherein:
        at least one of the plurality of wheels includes a steering mechanism coupled to the chassis;
        the coupling is selectively and rigidly engageable with a mated coupling of another independent vehicle with zero degrees of freedom of motion between the independent vehicle and the another independent vehicle; and
        the active suspension system is configured to receive instructions; and wherein:
            the active suspension system is configured to match a position of the another independent vehicle in at least two dimensions.

2. The independent vehicle of claim 1 wherein:
    the coupling is selectively retractable into the chassis from a first position to a second position.

3. The independent vehicle of claim 1 wherein:
    the coupling is rigidly coupleable to the another independent vehicle with zero degrees of freedom of motion between the independent vehicle and the another independent vehicle.

4. The independent vehicle of claim 1 wherein:
    the coupling includes a plurality of links coupled to each other; and wherein:
        the plurality of links selectively provides a variable degree of freedom ranging from zero degrees of freedom to at least two degrees of freedom.

5. The independent vehicle of claim 1 wherein:
    the local controller is configured to be selectively slaved to a receiver or to a communication adapter to control the at least one vehicle system.

6. The independent vehicle of claim 1 further comprising:
    a compartment disposed on the chassis for housing at least one of passengers or cargo;
    a first door disposed in the first end of the chassis; and
    a second door disposed in the second end of the chassis; and wherein:
        the first end is a front portion of the independent vehicle in the principal direction of locomotion;
        the second end is opposite of the first end; and
        the first and the second doors permit selective ingress and egress of the passengers or the cargo between the independent vehicle and the another independent vehicle whilst both the independent vehicle and the another independent vehicle are moving.

7. The independent vehicle of claim 6 wherein:
    the first door is configured to open while the independent vehicle is in motion and when the independent vehicle is rigidly coupled to the another independent vehicle disposed on the first end of the independent vehicle.

8. The independent vehicle of claim 1 wherein:
    the independent vehicle is an accessory independent vehicle rigidly coupleable to an existing plurality of rigidly coupled independent vehicles; and wherein:
        the accessory independent vehicle is a service function to passengers or cargo in at least independent vehicles in the existing plurality of rigidly coupled independent vehicles; and
        the accessory independent vehicle is selectively engageable and disengageable with the existing plurality of coupled independent vehicles.

9. The independent vehicle of claim 1 wherein:
    a given plurality of the plurality of wheels of the independent vehicle are in contact with a driving surface; and
    the given plurality of wheels is linked together such that an axle of each of the given plurality of wheels is configurable to simultaneously points to a center point of a turning radius for a plurality of independent vehicles coupleable as a single unit.

10. The independent vehicle of claim 1 wherein:
    the independent vehicle is configurable to have at least one selectively retractable wheel.

11. A transportation system comprising:
a plurality of independent vehicles selectively coupled to each other; wherein at least two of the plurality of independent vehicles each comprises:
   a chassis having a plurality of wheels, and having a first end and a second end;
   at least one vehicle system of an energy storage system, a propulsion system, a braking system, an active suspension system, and a steering system;
   a coupling disposed in the first end or the second end of the chassis;
   a mated coupling disposed in an end of the chassis opposite of that for the coupling:
   means for communicating between the at least two of the plurality of independent vehicles and a local controller for controlling at least one of the vehicle systems; and wherein:
      at least one of the wheels includes a steering mechanism coupled to the chassis; and
      the coupling is selectively rigidly engageable with a mated coupling of another independent vehicle; and wherein
      each of the at least two of the independent vehicles further comprise:
         an active suspension configured to receive instructions; and wherein:
         the active suspension of each of the at least two of the plurality of independent vehicles is configured to match a position of another one of the two of the plurality of independent vehicles in at least two dimensions.

12. The system of claim 11, wherein:
at least two of the plurality of independent vehicles are rigidly coupled together with zero degrees of freedom of movement with respect to each other; and
each of the at least two of the plurality of independent vehicles is selectively disengageable.

13. The system of claim 12 wherein:
a given plurality of wheels of the rigidly coupled independent vehicles are in contact with a driving surface; and
the given plurality of wheels is linked together such that an axle of each of the plurality of wheels is configurable to simultaneously point to a center point of a turning radius for turning the rigidly coupled independent vehicles as a single unit.

14. The system of claim 12 wherein:
at least one of the rigidly coupled independent vehicles further comprises:
   a receiver coupled to the local controller; and wherein:
      the receiver is configured to receive a master signal from an external source; and
      the local controller is configured to be selectively slaved to the receiver or to a communication adapter to control the at least one vehicle system.

15. The system of claim 12 wherein:
the coupling of a first independent vehicle and a mated coupling of a second independent vehicle is selectively engageable and disengageable while the first independent vehicle and the second independent vehicle are moving.

16. The system of claim 11 wherein:
a subset of at least two of the rigidly coupled independent vehicles each has a front door and a back door;
the back door of a first independent vehicle aligns with the front door of a second independent vehicle; and
the back door and the front door are selectively operable to allow movement of at least one of passengers or cargo between the subset of at least two of the rigidly coupled independent vehicles.

17. The system of claim 11 wherein:
at least one of the independent vehicles in the system has at least one selectively retractable wheel when the at least one independent vehicle is rigidly coupled to at least one other independent vehicle in the system; and
the at least one independent vehicle has a same height when driving on the at least one selectively retractable wheel as when the at least one selectively retractable wheel is retracted.

18. A transportation system comprising:
a plurality of independent vehicles selectively coupled to each other; wherein at least two of the plurality of independent vehicles each comprises:
   a chassis having a plurality of wheels, and having a first end and a second end;
   at least one vehicle system of an energy storage system, a propulsion system, a braking system, an active suspension system, and a steering system;
   a coupling disposed in the first end or the second end of the chassis;
   a mated coupling disposed in an end of the chassis opposite of that for the coupling:
   means for communicating between the at least two of the plurality of independent vehicles and a local controller for controlling the at least one vehicle system; and wherein:
      at least one of the wheels includes a steering mechanism coupled to the chassis;
   the coupling is selectively rigidly engageable with a mated coupling of another independent vehicle; and
   at least one of the plurality of independent vehicles selectively coupled to each other comprises:
      an accessory independent vehicle rigidly coupled to an existing plurality of rigidly coupled independent vehicles; and wherein:
         the accessory independent vehicle is a service function to passengers or cargo in at least one of the independent vehicles in the existing plurality of rigidly coupled independent vehicles; and
         the accessory independent vehicle is selectively engaged and disengaged with the existing plurality of rigidly coupled independent vehicles.

19. The system of claim 18, wherein:
at least one of the rigidly coupled independent vehicles further comprises:
   a receiver coupled to the local controller; and wherein:
      the receiver is configured to receive a master signal from an external source; and
      the local controller is configured to be selectively slaved to the receiver or to a communication adapter to control at least one of the vehicle systems.

20. The system of claim 18, wherein:
at least two of the plurality of independent vehicles are rigidly coupled together with zero degrees of freedom of movement with respect to each other; and
each of the plurality of independent vehicles is selectively disengageable.

21. The system of claim 20, wherein:
a given plurality of wheels of the rigidly coupled independent vehicles are in contact with a driving surface; and the given plurality of wheels is linked together such that an axle of each of the given plurality of wheels is configurable to simultaneously point to a center point of a turning radius for turning the at least two rigidly coupled independent vehicles as a single unit.

22. The system of claim 20, wherein:

a subset of at least two of the rigidly coupled independent vehicles each has a front door and a back door;

the back door of a first independent vehicle aligns with the front door of a second independent vehicle; and the back door and the front door are selectively operable to allow movement of at least one of passengers or cargo between the subset of the at least two rigidly coupled independent vehicles.

23. The system of claim 18, wherein:

the coupling of a first independent vehicle and a mated coupling of a second independent vehicle is selectively engageable and disengageable while the first independent vehicle and the second independent vehicle are moving.

24. The system of claim 18, wherein:

at least one of the independent vehicles in the system has at least one selectively retractable wheel when the at least one independent vehicle is rigidly coupled to at least one other independent vehicle in the system; and the at least one independent vehicle has a same height when driving on the retractable wheel as when the retractable wheel is retracted.

* * * * *